(12) United States Patent
Hayashida

(10) Patent No.: US 6,304,178 B1
(45) Date of Patent: Oct. 16, 2001

(54) DOOR SAFETY SYSTEM

(75) Inventor: Tatekazu Hayashida, Kanagawa (JP)

(73) Assignee: Kabushiki Kaisha Tsuden, Kanagawa (JP)

( * ) Notice: Subject to any disclaimer, the term of this patent is extended or adjusted under 35 U.S.C. 154(b) by 0 days.

(21) Appl. No.: 09/127,732

(22) Filed: Aug. 3, 1998

(30) Foreign Application Priority Data

Jan. 20, 1997 (JP) .................................................. 9-007539
Jan. 7, 1998 (JP) ................................................ 10-001526

(51) Int. Cl.[7] .................................................. G08B 13/08
(52) U.S. Cl. ...................... 340/545.1; 340/552; 307/358; 320/2; 328/5
(58) Field of Search ............................. 340/545.1, 686.6, 340/552; 320/2; 250/221, 341; 307/358; 328/5; 324/639; 318/468, 286, 452; 49/360, 30, 25, 26, 27, 28

(56) References Cited

U.S. PATENT DOCUMENTS

| | | | |
|---|---|---|---|
| 4,910,464 | * | 3/1990 | Trett et al. ................................ 328/5 |
| 4,967,083 | * | 10/1990 | Kornbrekke et al. ................. 250/341 |
| 4,973,837 | * | 11/1990 | Bradbeer ............................... 250/221 |
| 5,076,016 | * | 12/1991 | Adams et al. ........................... 49/360 |
| 5,149,921 | * | 9/1992 | Picado ................................... 187/130 |
| 5,546,188 | * | 8/1996 | Wangler et al. ...................... 356/376 |
| 5,576,627 | * | 11/1996 | McEwan ................................ 324/639 |
| 5,594,316 | * | 1/1997 | Hayashida ................................ 320/2 |
| 5,789,887 | * | 8/1998 | Elischewski .......................... 318/468 |
| 5,996,281 | * | 12/1999 | Takano et al. ........................... 49/26 |

FOREIGN PATENT DOCUMENTS 6-66065   3/1994   (JP) .
8-149651  6/1996   (JP) .

* cited by examiner

Primary Examiner—Edward Lefkowitz
Assistant Examiner—Davetta W. Goins
(74) Attorney, Agent, or Firm—Birch, Stewart, Kolasch & Birch, LLP

(57) ABSTRACT

The present invention provides a door safety system, which operates safely and surely with respect to an automatic door system having doors moving rapidly, and which prevents a person or an obstacle getting near the doors from colliding with the moving doors. Translucent-type and reflex-type non-contact proximity switches are provided at moving doors for detecting a person or an obstacle and for controlling movements of the doors so as to prevent the person or the obstacle from colliding with the moving doors. Furthermore, a cable guide electrically connects the moving doors and a side of building so that the person or the obstacle can be detected with respect to a moving space of the moving doors. Additionally, one or a plurality of signal transmitting sections or signal receiving sections of a non-contact proximity switch are separately provided at an immovable portion, so that the person or the obstacle can be detected with respect to a moving space of the moving doors so as to prevent the person or the obstacle from colliding with the moving doors

32 Claims, 32 Drawing Sheets

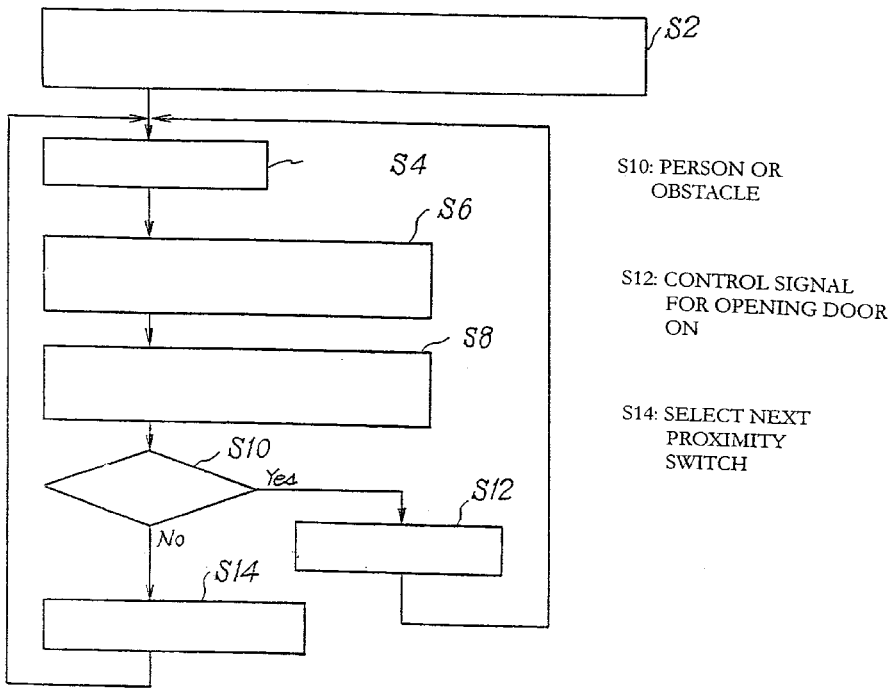

FIG. 14

S2: STORE THE ORDER OF OPERATION WITH RESPECT TO EACH PROXIMITY SWITCH STORE RECEIVING MODE, COLLECT INFORMATION WITH RESPECT TO CORRESPONDENCE BETWEEN DISTANCE AND SIGNAL LEVEL

S10: PERSON OR OBSTACLE

S12: CONTROL SIGNAL FOR OPENING DOOR ON

S14: SELECT NEXT PROXIMITY SWITCH

S4: INPUT INFORMATION WITH RESPECT TO DISTANCE

S6: DETERMINE OUTPUT SIGNAL LEVEL ACCORDING TO DISTANCE INFORMATION

S8: DRIVE PROXIMITY SENSOR ACCORDING TO ORDER OF REGISTRATION AND CONTROL SIGNAL LEVEL OF REFRECTED LIGHT

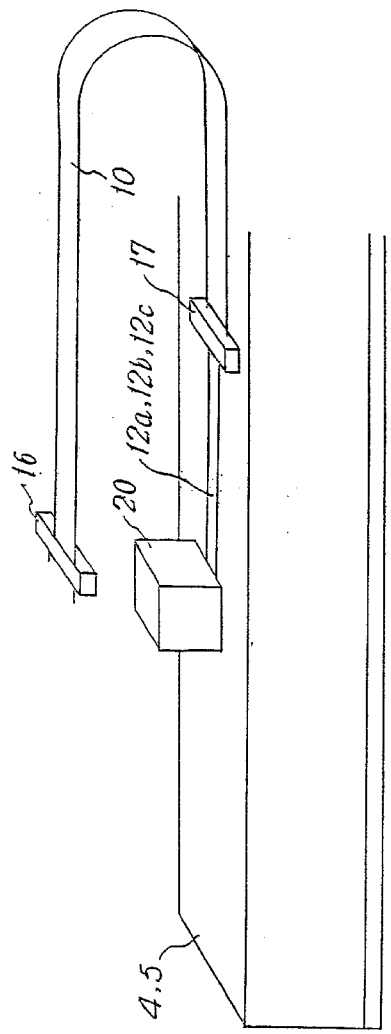

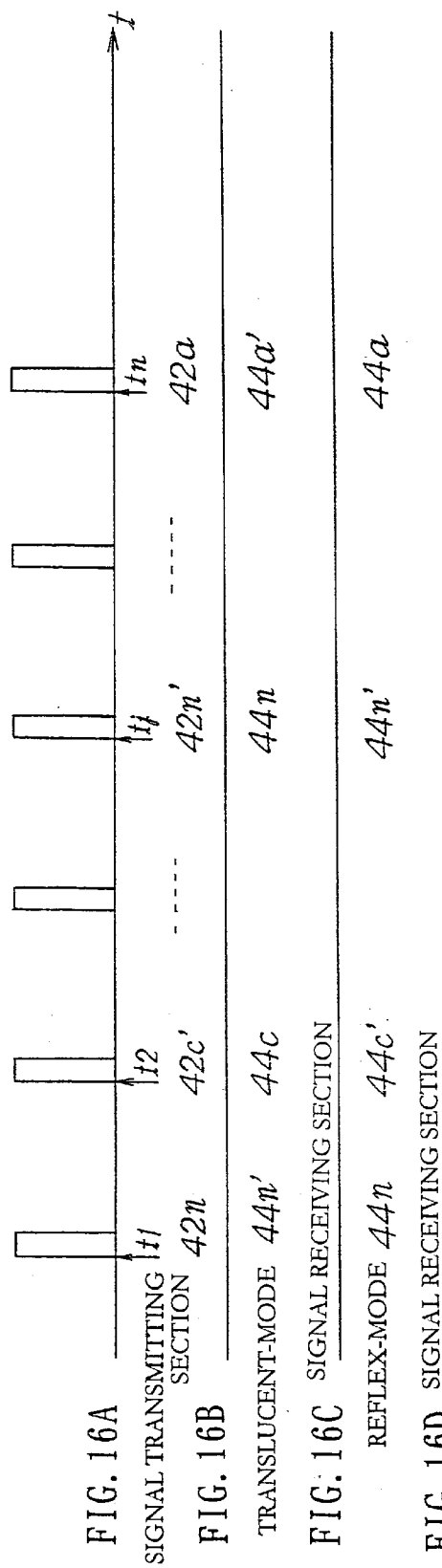

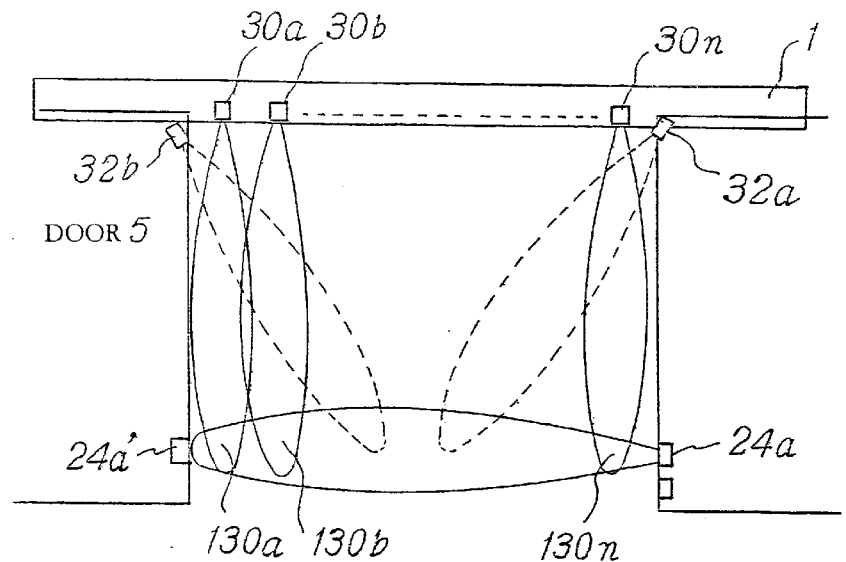
FIG. 24A
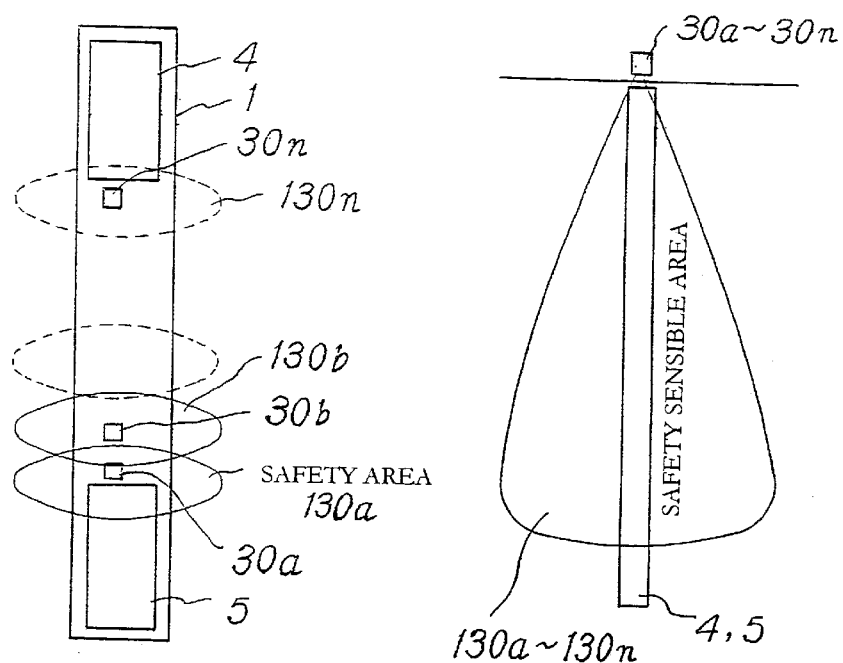
FIG. 24B
FIG. 24C

| DISTANCE BETWEEN DOORS | ELECTRIC POWER SUPPLY CONTROL TABLE | | | | | | | | |
|---|---|---|---|---|---|---|---|---|---|
| | 30a | 30b | | | 30i | | | 30(n-1) | 30n |
| FULL OPEN | On | On | | | On | | | | On |
| FULL OPEN $-u$ | Off | On | | | On | | | On | Off |
| FULL OPEN $-2u$ | Off | Off | On | | On | | | On | Off |
| ⋮ | | | | | | | | | |
| ⋮ | | | | | | | | | |
| $2u$ | Off | | | Off | On | On | Off | ----- | Off |
| $u$ | Off | | | Off | On | | Off | ----- | Off |

FIG. 34

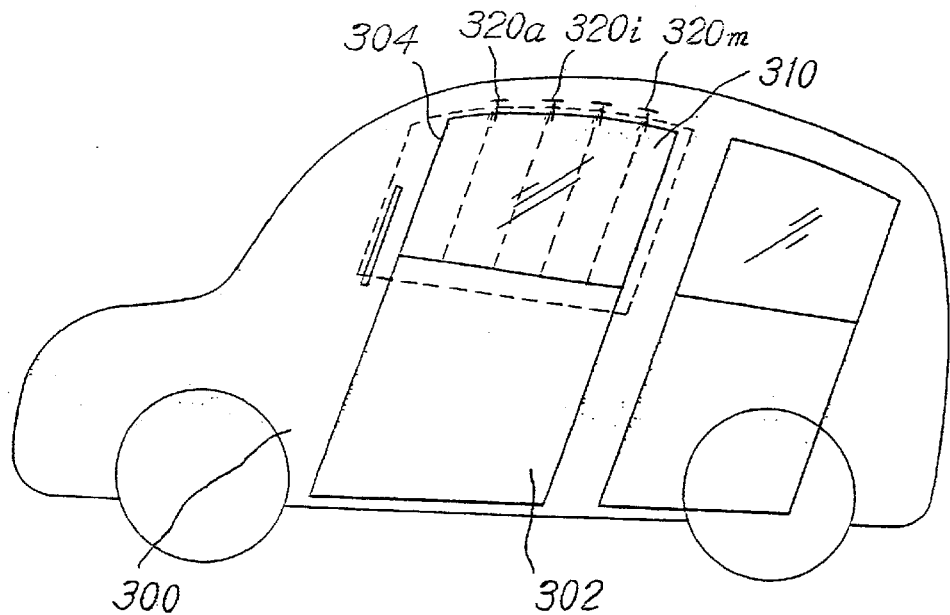
FIG. 36A
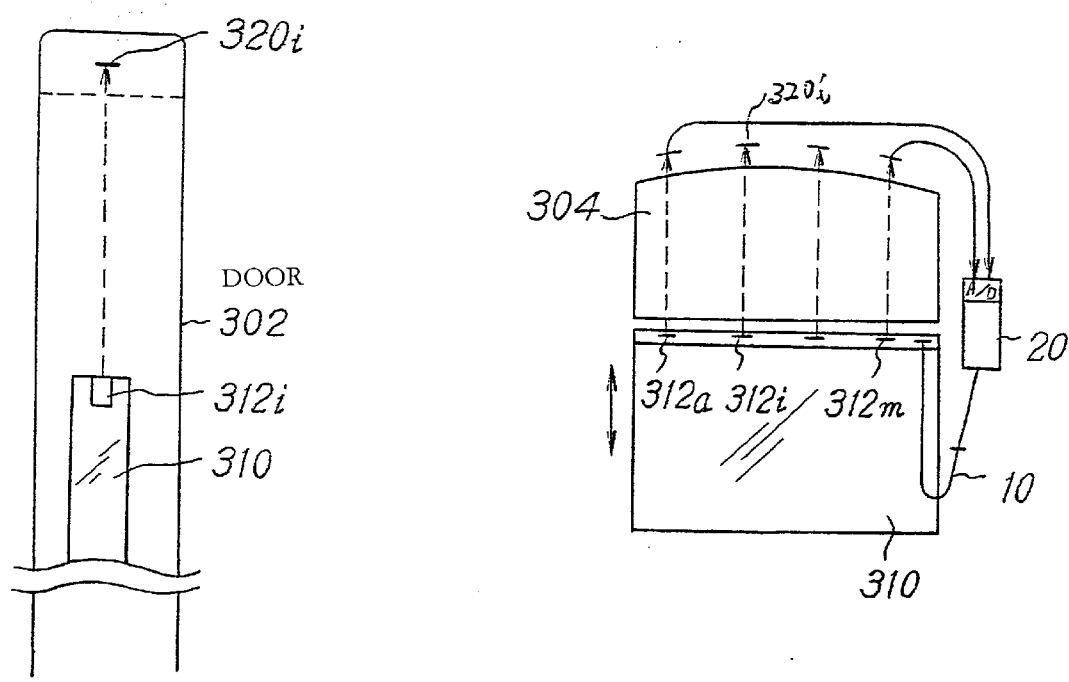
FIG. 36B
FIG. 36C

DOOR SAFETY SYSTEM

BACKGROUND OF THE INVENTION

1. Field of the Invention

The present invention relates to a door safety system, which controls an opening and closing of doors if a person or an obstacle is getting near an automatic door provided at an entrance or an exit of building, or a moving door which is used for an opening and closing door of an elevator, or an door of vehicle, and which prevents the person or the obstacle from colliding with the door until when the person or the obstacle pass through the door.

2. Description of the Related Art

An activation switch such as a proximity switch, which opens a door by detecting that a person is getting near an entrance or an exit, or a touch switch, which opens a door by a person touching a part of the door, is used for an automatic door system provided at the entrance or the exit of building.

Conventionally, in addition to the above activation switch, there was provided with a safety light switch, provided at an entrance or an exit of building, for detecting whether or not there is a person so as to prevent the person from being caught by doors when the person stops at the entrance or the exit.

For example, as shown in FIG. 1A, a light emitting device 103 and a light receiving device 104 are respectively provided at a pole 101 and a pole 102, which are respectively located at a left side and a right side of an entrance, so that the device 103 and the device 104 face each other. This light switch is referred to as "a translucent-type light switch" hereinafter. Therefore, it is judged that there is a person 105, if a light passing between the devices 103 and 104 is interrupted. Alternatively, as shown in FIG. 1B, a reflex-type light switch, wherein a light emitting device 106 and a light receiving device 107 are provided at the pole 101 in parallel, can be used for detecting the person 105 by receiving a reflected light. The translucent-type light switch shown in FIG. 1A has a detectable area having a long distance, but the area is narrow like a spotlight. Therefore, for the safety side, it is necessary to provide a plurality of switches. On the other hand, the reflex-type light switch has a relatively wide detectable area, but there is a drawback that the switch does not have a long detectable distance.

Furthermore, a door safety system, wherein the translucent-type light switch and the reflex-type light switch are used together, is described in the unexamined patent publication No. Hei 6 (1994)-66065, the application of which is filed by the present applicant.

However, there is a problem that the above light switch has an insensible area, since light has a character that it goes straight on ahead, and therefore, the sensible area is limited accordingly. Furthermore, an activation switch and two kinds of safety switches should be provided in order to control an opening and a closing of doors, and therefore, there is a problem that an additional constructional work is also necessary. There is a desire that the additional construction work with respect to poles, floors or the like is decreased as less as possible. If a safety and activation sensor for preventing a collision is used, there is a possibility that an opposite door, or pole, or wall of building is detected by the sensor. Therefore, a safety and activation wide range detection sensor, which only detect a person passing through doors without detecting a device or a structural object around the doors, is desired. Furthermore, it was desired that an apparatus provided at the door has low energy consumption, and in order to improve a reliability of an apparatus, it was very important to supply electric power to the apparatus provided at the door from building without contact.

With reference to FIG. 2A, the fact that there is a high possibility that the above light-type activation switch has an insensible area will be explained hereinafter. As shown in FIG. 2A, reflex-type non-contact proximity switches 110a, 110b are provided at a building side, which is close to a central part of automatic doors 4, 5 provided at an entrance and an exit. FIG. 2B is a top view of this construction. Sensible areas 120a, 120b are provided so that the sensible areas are not influenced by movements of the doors. Therefore, an area 122a including a moving space of the doors constitutes an insensible area, and it was impossible to detect a person or an obstacle within the area 122a. FIG. 2c is a cross-sectional view of the insensible area. A distance between an inner side 11a of the non-contact proximity switch 110a and the door 4 or 5, and a distance between an inner side 111b of the non-contact proximity switch 110b and the door 4 or 5 should be greater than 50 mm. The width of the insensible area 122b was about 150–300 mm. Therefore, auxiliary light switches were provided at an immovable portion of building so as to prevent a person, for example a child, from being caught by closing doors, even if the person stops within the sensible area. However, it was impossible to detect the person within the moving area of the doors 4, 5.

Furthermore, in the case of the reflex-type non-contact proximity switch, if a distance between the proximity switch and a person or an obstacle is relatively changed, an output of a sensor is greatly varied. It is easy to provide a circuit construction wherein a switching operation for detecting moving objects is performed by using a detecting signal, which corresponds to a difference of sensor outputs. However, there is a problem that it is impossible to detect a person just standing in front of the sensor by only using the switching operation. On the other hand, if a switching operation for detecting an immovable person or obstacle was performed, it was very difficult to perform it, since output of a sensor, a temperature drift of the sensor, and a sensible range of the sensor are greatly varied.

Furthermore, since doors are always moving, a disconnection of a cable may happen. It becomes a cause of failure or trouble to provide sensors and an apparatus at a side of moving doors, and therefore, it should be avoided. If the sensors and the apparatus are provided at the doors, it is desired that energy consumption is decreased as less as possible, and then, a method wherein electric power is supplied from an immovable portion of building to moving doors without electrical contact, is generally used.

In a case of moving doors used for an elevator system, since moving distances of the doors are short, it is necessary to detect a person or an obstacle within a vary narrow space. Additionally, in this case, since a speed for opening and closing doors is relatively low compared with doors for building, a sensor for detecting a person or an obstacle without any electrical contact is not practically used. Therefore, by associating a contact sensor with the moving doors, it is detected that a person is caught between the doors, and then, the doors start opening. Furthermore, in case of an automatic door system or an automatic window system used for a vehicle such as a train, an automobile or the like, a space for mounting a safety sensor tends to be limited to a very narrow space. Therefore, for the time being, a non-contact-type door safety system is not practically used.

SUMMARY OF THE INVENTION

Accordingly, an object of the present invention is to substantially eliminate defects and drawback encountered in the prior art and to provide a door safety system, wherein translucent-type or reflex-type non-contact proximity switches such as optical-type proximity switches, ultra-sonic proximity switches, millimeter wave radar sensors, or the like are provided at moving doors, so as to surely and perfectly detect a person getting near the doors without any insensible area and without detecting any apparatus or constructional objects around the doors, and wherein stable and sufficient electric power is supplied to each proximity switch and to a control unit during an operation of an apparatus provided at the moving doors without making any additional construction work with respect to poles, floors and so on.

Another object of the present invention is to provide a door safety system wherein signal transmitting sections and signal receiving sections of the translucent-type non-contact proximity switches or the reflex-type non-contact proximity switches are separately provided at moving doors and at immovable portions of building, so as to surely and perfectly detect a person passing through an entrance or an exit, or a person just standing near the doors within a movable area of the moving doors without having any insensible area, and wherein stable and sufficient electric power is always supplied to apparatuses provided at the moving doors.

The present invention relates to a door safety system and according to the present invention, the above mentioned object can be achieved by a door safety system including: a translucent-type or a reflex-type non-contact proximity switch, provided at moving doors used for an automatic door system, for detecting a person or an obstacle and for controlling a movement of the doors so as to prevent the person or the obstacle from colliding with the moving doors, so that the person or the obstacle can be detected with respect to a moving space of the moving doors without any insensible area.

The present invention relates to a door safety system and according to the present invention, the above mentioned object can be achieved by a door safety system including: a plurality of signal receiving sections or signal transmitting sections of non-contact proximity switch, provided at sides of moving doors, for detecting a person or an obstacle and for controlling a movement of the doors to prevent the person or the obstacle from colliding with the moving doors; and a plurality of signal transmitting sections, which corresponds to the signal receiving sections, or signal receiving sections, which corresponds to the signal transmitting sections, provided at immovable portion, so that the person or the obstacle can be detected with respect to a moving space of the moving doors without any insensible area so as to prevent the person or the obstacle from colliding with the moving doors.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 14 is a flowchart showing the operation of the apparatus shown in FIG. 12;

FIG. 15 is a view showing an example of a scanning sequence registration table;

FIGS. 16A to 16D are timing charts showing operational examples of the apparatus shown in a FIG. 12;

FIGS. 24A to C are views for explaining the reason why the occurrence of the insensible area can be prevented according to the present invention;

FIG. 25 is a view for explaining the operation principle of a cable guide used for the present invention;

FIG. 34 is a view showing an example of a control pattern for making sensors on or off according to a distance between doors;

FIGS. 36A to C are views showing an example wherein the present invention is applied to a window for a vehicle.

DESCRIPTION OF THE PREFERRED EMBODIMENTS

Figure 1A:
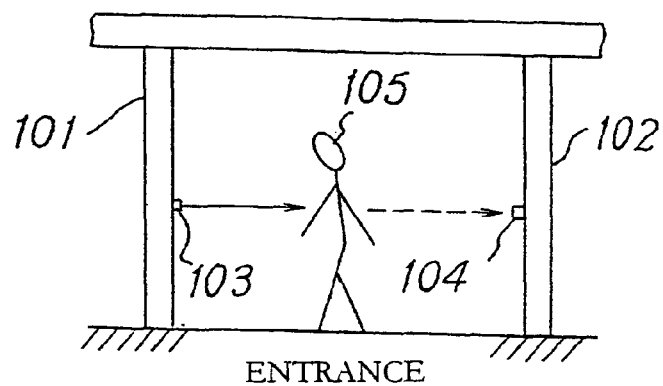
FIGS. 1A and 1B are views respectively showing an example of a conventional safety system.
Figure 1B:
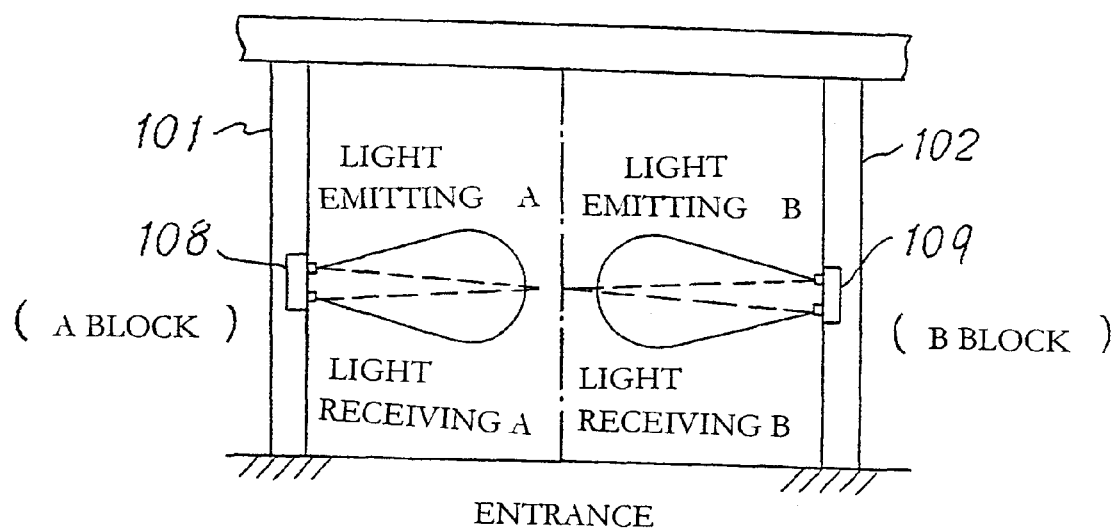
Figure 2A:
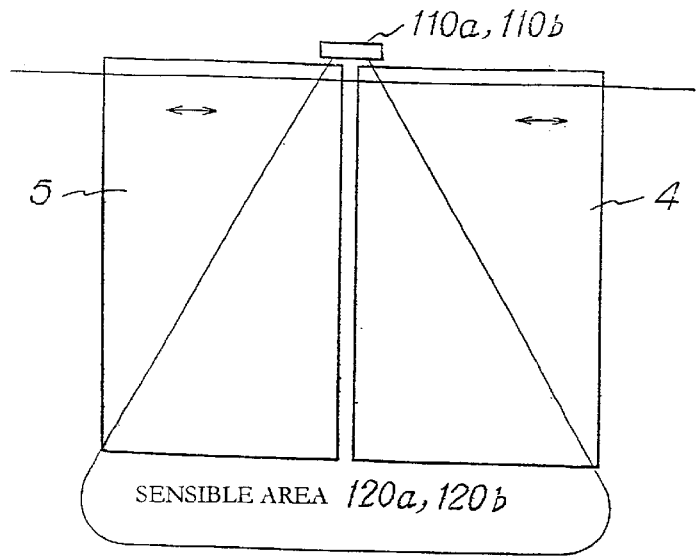
FIGS. 2A to 2C are views for explaining the operation principle (occurrence of insensible area) of light-type activation system.
Figure 2B:
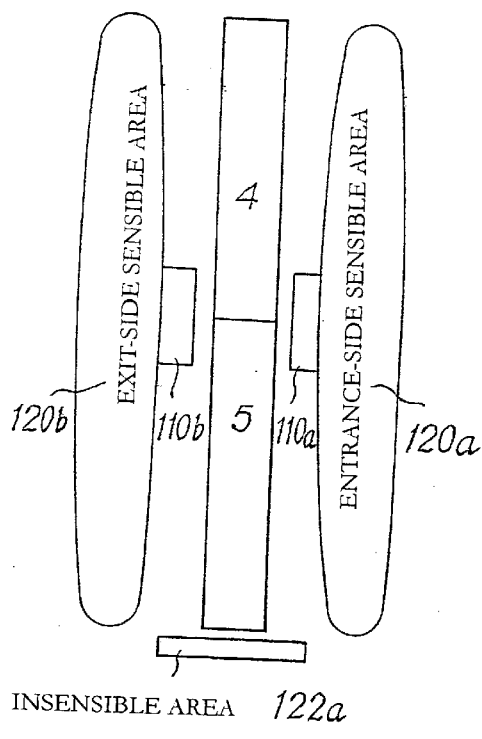
Figure 2C:
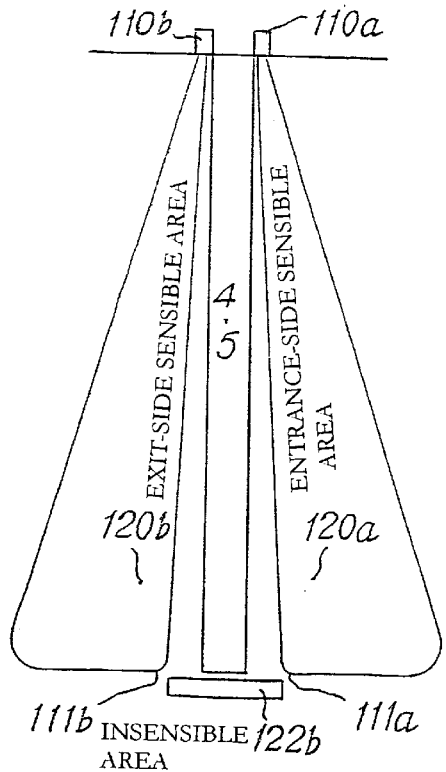
Figure 3:
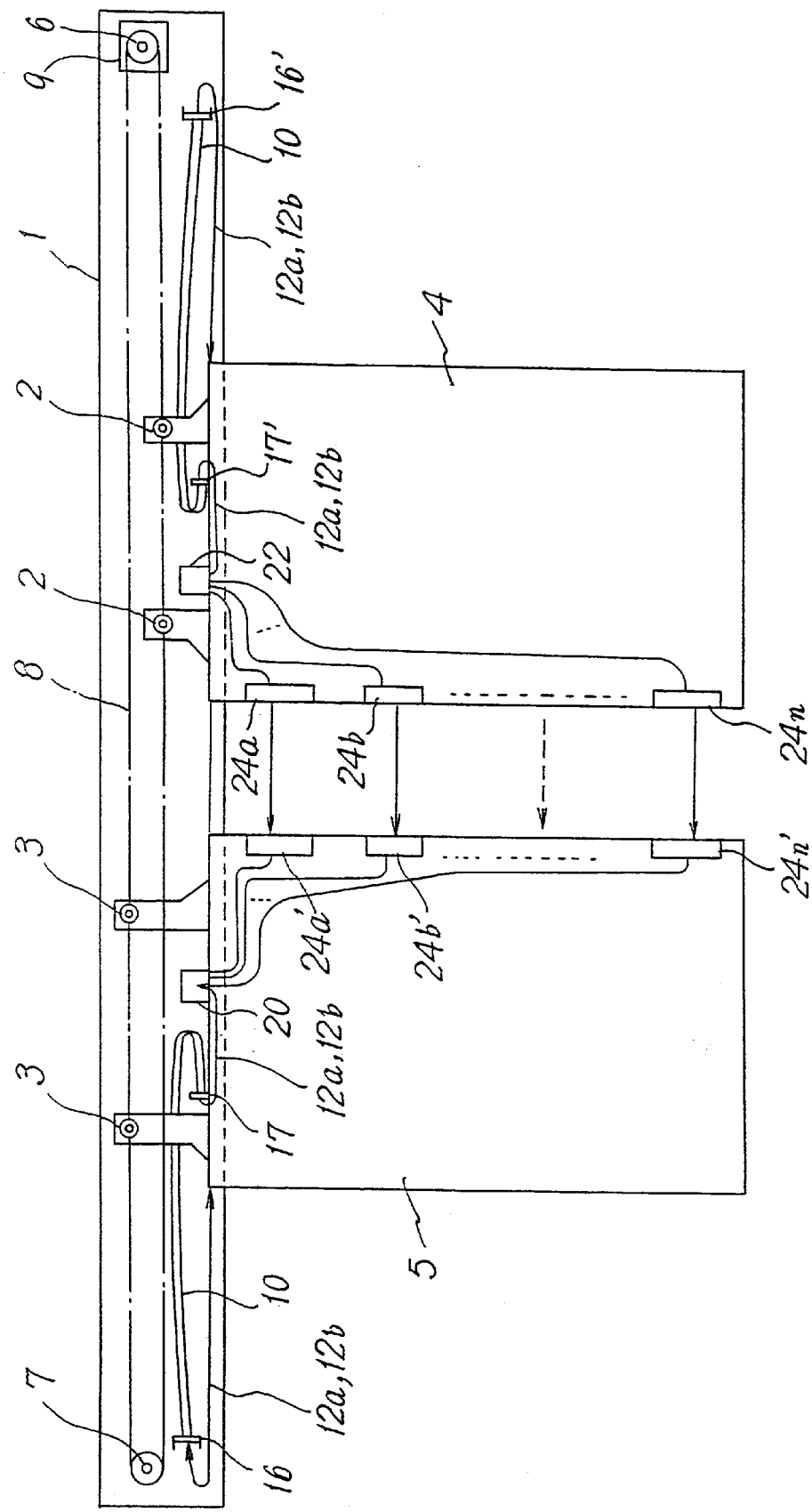
FIG. 3 is a block view showing an example of the present invention using a translucent type non-contact switch.
Figure 4:
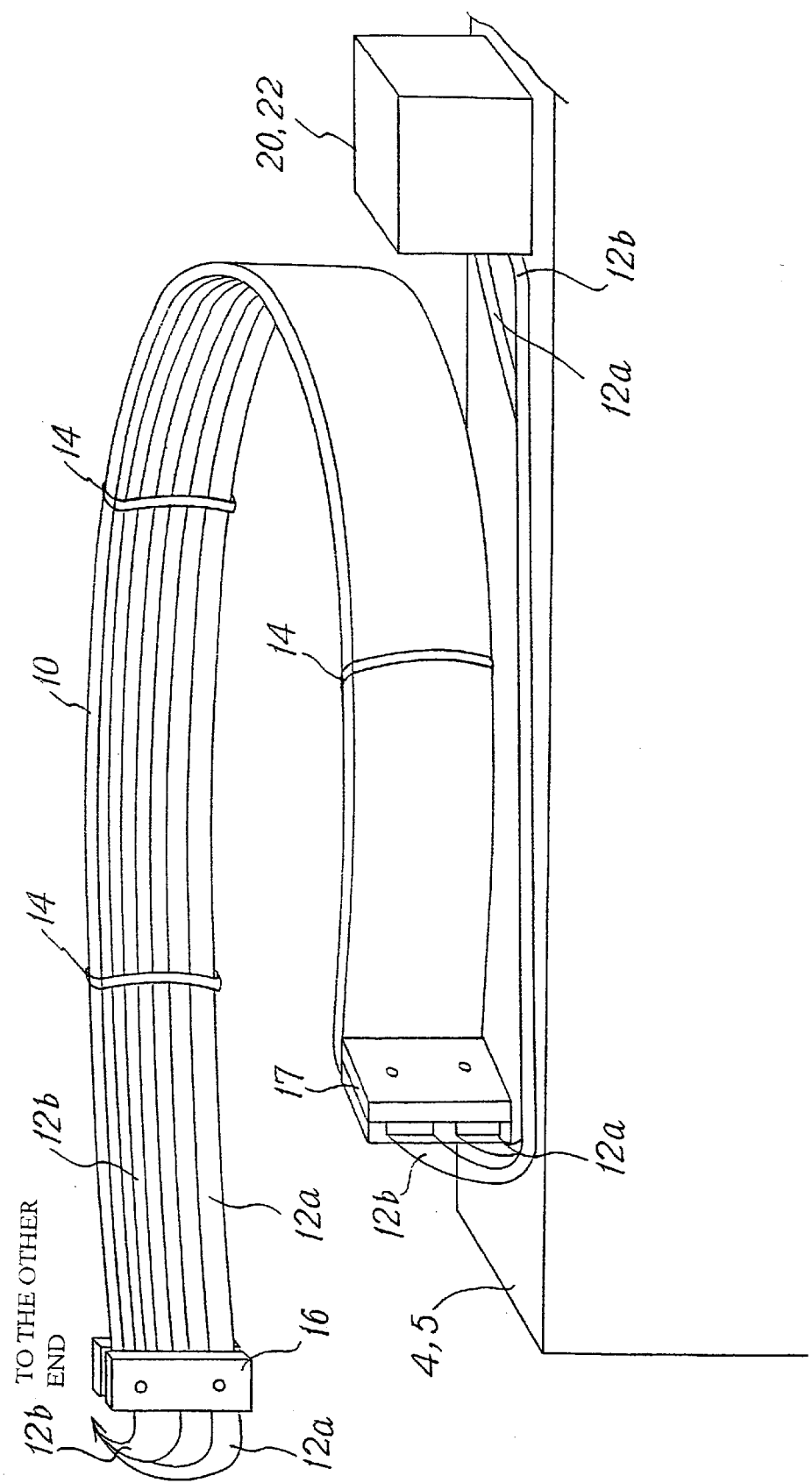
FIG. 4 is a perspective view partially showing an example of an automatic door wherein the cable guide of the present invention is mounted.

A preferred embodiment according to the present invention will now be described below with reference to the accompanying drawings. Firstly, an automatic door is constructed as shown in FIG. 3. A transom (channel, base) 1 suspends doors 4, 5 through sliding rollers 2, 3. A belt 8 is provided under tension by providing axes with pulleys 6, 7 at the both ends of the transom 1. For example, a part of lower side of the belt 8 is engaged with the door 4, and a part of upper side of the belt 8 is engaged with the door 5. Furthermore, the pulley 6 is rotated by a motor unit 9 including a motor and a deceleration mechanism, and then, the doors 4, 5 are opened or closed. The rotation of the motor unit 9 is controlled by a control unit 20, which arithmetically processes each output of translucent type non-contact proximity switches (or sensors) 24a–24n, provided between the doors 4, 5, having a directivity. As the above translucent type non-contact proximity switches 24a–24n, a ray-optical switch having a light emitting/receiving device, an ultrasonic proximity switch having ultrasonic transmitting and receiving units, an infrared detecting type proximity switch having a infrared light-emitting/receiving device, or a millimeter wave radar sensor having transmitting and receiving sensors, each of which includes a millimeter wave radar, can be used. As shown in FIG. 4, electric power cables 12a, 12b, and a cable guide 10, which holds and guides the electric power cables 12a, 12b by using a flexible support member 10, are provided in parallel. The support member 10 is made of a strip steel product, which is arc-shaped and curved in a transversal direction. One end of the support member 10 is fixed to the movable opening and closing doors 4, 5, and the other end of the support member 10 is fixed to a building. Electric power and signals are supplied through a cable guide 10 having a parallel portion parallel to an immovable portion where the movable doors 4, 5 are fixed to building, and a curved portion substantially having a predetermined radius of curvature where the arc-shaped convex portion constitutes an outer surface.

Figure 5:
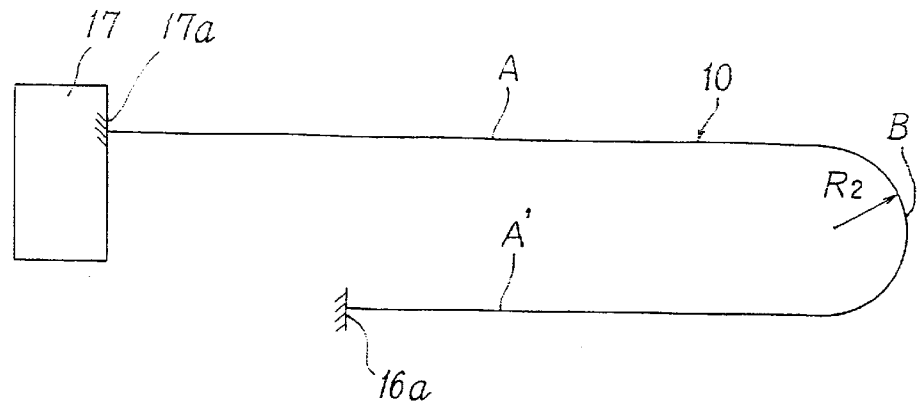
FIG. 5 is a view showing a mounted condition wherein a support member is mounted on the automatic door.

Namely, the present invention is provided with movable electric portions (doors 4, 5), which respectively reciprocate together with the belt 8, and power supply cables 12a, 12b for supplying electric power to the movable electric portions from an electric power supply unit 16 fixed to the building and for transmitting signal. The cable guide 10, provided for a linear movement mechanism, which guides and holds the electric power supply cables 12a, 12b by the support member 10, is used. The support member 10 is made of the strip steel product, which is arc-shaped and curved in the transversal direction. One end of the support member 10 is fixed to the movable electric portion 4 or 5, and the other end of the support member 10 is fixed to the electric power supply unit 6. Therefore, as shown in FIG. 5, the present invention is provided with: parallel portions A, A', which are parallel to a fixed portion 17a of the movable electric portions 4 or 5, and a fixed portion 16a of the fixed electric power supply unit 16; and a curved portion B substantially having a predetermined radius of curvature, where the arc-shaped convex portion constitutes an outer surface. Furthermore, the present invention is characterized in that the radius of curvature R1 of the arc-shaped portion of the support member 10 is substantially equal to the radius of curvature R2 of the curved portion B of the support member 10.

According to the above construction, the electric power supply cables 12a, 12b respectively supply electric power from the fixed power supply units 16, 16' to the doors 4, 5, which reciprocate together with the belt 8, and transmit signal between the doors 4, 5 and the fixed electric power supply units 16, 16'. The electric power supply cables 12a, 12b are held and guided by the flexible support member 10.

Figure 6:
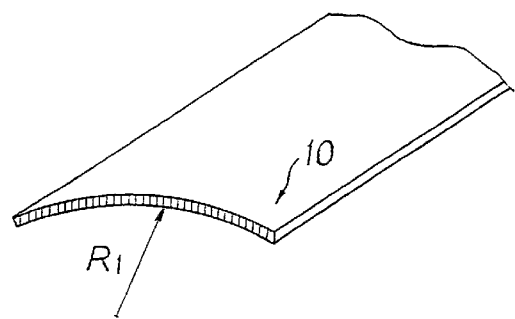
FIG. 6 is a cross-sectional view showing the construction of the support member.

The support member 10 is made of the strip steel product, and as shown in FIG. 6, the cross section thereof is curved and arc-shaped. Since the curved portion (the radius of curvature is R1) is provided, the radius of curvature of the curved portion R2 becomes constant when the support member 10 is curved in the longitudinal direction. Therefore, as shown in FIG. 5, in a case where one end of the support member 10 is fixed to the door 4 or 5, and where the other end of the support member 10 is fixed to the electric power supply units 16, 16' fixed to the building, the parallel portions A, A', which are parallel to the doors 4, 5, and to the fixed portions 17a, 16a, where the fixed power supplies 16, 16' are respectively fixed; and the curved portion B having a substantially constant radius of curvature so as to connect the parallel portions A, A'. Furthermore, the support member 10 is not deflected by the self-weight in the middle thereof.

Therefore, if the electric power supply cables 12a, 12b are guided by the support member 10, the electric power supply cables 12a, 12b are reciprocated along the support member 10 on the right and the left, and since the curved portion B is folded so that the portion B has the constant radius of curvature R2, the risk of disconnection can be reduced. In the embodiments, the support member 10 is made of a strip steel product. One end of the support member 10 is fastened to a mount 17 by using screws, and the other end of the support member 10 is fastened to a base 16 of the building.

The cross sectional view of the support member 10 is circular arc-shaped and curved in the transversal direction (the radius of curvature is R1) or parabolic arc-shaped, as shown in FIG. 6. Since the cross section in the transversal direction includes the arc-shaped portion, the radius of curvature of the curved portion becomes constant. Furthermore, as described in the Japanese Patent Application No. Hei 6 (1994)-312481, there is a correlation between the radius of curvature of the curved portion and that of the arc-shaped portion.

As shown in FIG. 3, when the support member 10 is mounted, it includes the parallel portions A, A', which are respectively parallel to the fixed portion 17a, where the door 4 or 5 is fixed, the fixed portion 16a, where the base 16 is fixed; and the curved portion B, which has a substantially constant radius of curvature of R2, and which is curved like a semi-circular shape so that one end of the parallel portion A and one end of the parallel portion are connected. Furthermore, with respect to the curved portion B, the circular arc-shaped convex portion (the radius of curvature is R1) constitutes an outer surface.

Preferably, the rigidity of the support member 10 is sufficiently high not to decrease the driving force, and the width thereof is sufficiently wide to cover the electric power supply cables 12a, 12b. According to the above construction, it is possible to guide and hold the electric power supply cables 12a, 12b without any effect on a driving mechanism. Furthermore, the support member 10 is not deflected by the self-weight in the middle thereof, and therefore, it is possible to guide and hold the electric power supply cables 12a, 12b in the case of the high-speed movement.

The present invention is characterized in that the radius of curvature R1 of the arc-shaped portion of the support member 10 is substantially equal to the radius of curvature R2 of the curved portion B of the support member 10. Namely, the radius of curvature R1 of the arc-shaped portion of the support member 10 and the radius of curvature R2 of the curved portion B being mounted can be influenced by the dimension of the width, the thickness of the member, and the material. However, there is a proportional relation between R1 and R2.

Figure 7:
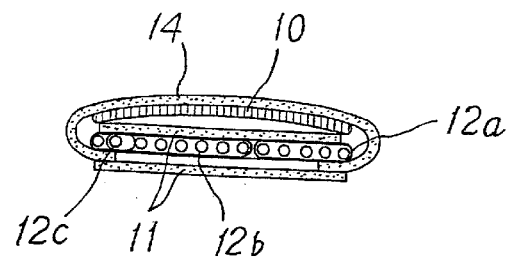
FIG. 7 is a sectional view of a cable guide.

FIG. 7 is a sectional view where the electric power supply cables 12a, 12b are provided along the support member 10 according to the present embodiment. In the present embodiment, multicore flat cables are used as the electric cables 12. The multicore flat cables are separately used as an electric power supply cable 12a, and as a signal transmitting cable 12b. The flat cables 12a, 12b are provided between protective sheets 11 so that the upper and the lower surfaces of the flat cables 12a, 12b are covered with the protective sheets 11. Under this condition, the support member 10 is laminated on the protective sheet 11. Furthermore, the flat cables 12a, 12b and the support member 10 are movably bound by strip seals 14 at regular intervals in the longitudinal direction of the support member 10. The strip seal is provided so that the flat cables 12a, 12b can smoothly reciprocate along the support member 10. In the present embodiment, the flat cables 12a, 12b are used as an example. However, it is also possible to use round cables instead of the flat cables.

According to the above construction, the support member 10 is not floated and wrapped. Therefore, the damage of the cable can be decreased and an accident like the disconnection of the cable and contact failure can be avoided. Furthermore, since the construction of the cable guide is compact and simple, the cable guide is appropriate for an automatic door, which operates quite hard and therefore, which, requests the high durability and the high reliability.

For example, since it is possible to use a spring steel, which is used for a steel measuring tape available on the market, as the support member 10, it is possible to cut a total cost sharply.

Figure 8A:
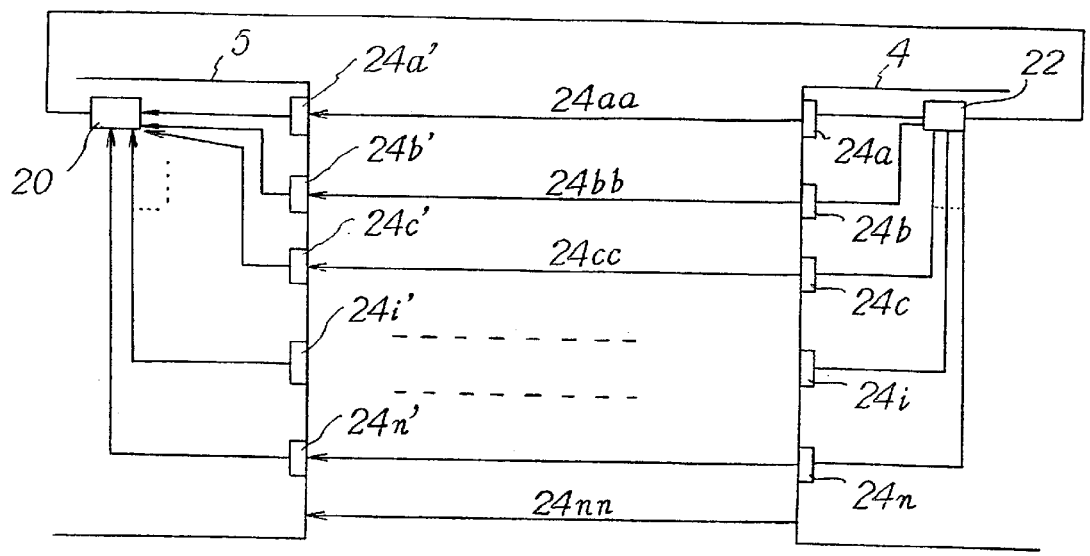
FIGS. 8A and 8B are a front view and a plan view for explaining the operation of the automatic door shown in FIG. 3.
Figure 8B:
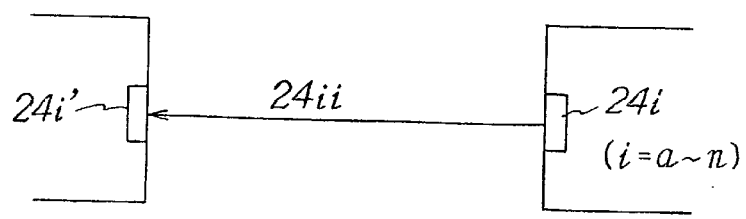

With respect to the above construction, the operation will be explained with reference to FIGS. 8A and 8B. Signal transmitting sections 24a–24n of the translucent non-contact proximity switch 24 are arranged at either one of the opening and closing doors or the building. The signal receiving sections 24a'–24n' are arranged at the other one of the doors or a single siding door. Therefore, it is possible to provide a door safety system which never pinches a person or an obstacle, who is passing between the doors, by using a control unit 20 which monitors output signals from the translucent non-contact proximity switches, even if the person or the obstacle stops in a moving area of the opening and closing doors 4, 5. The cable guide 10 can supply electric energy so as to be sufficient for the opening and closing doors 4 or 5. Therefore, it is possible to operate each non-contact proximity switch at any time. However, it is preferable to perform ON-OFF control by time sharing with perfectly synchronizing a distributor 22 and the control unit 20, and with sequentially synchronizing the signal-transmitting/light-emitting sections 24a–24n of the proximity switch, and the signal-receiving/light-receiving sections 24a'–24n' for energy saving. More concretely, it is preferable to firstly operate the translucent proximity switch of the signal-transmitting section 24n and the signal-receiving section 24n' provided at the lowest stage shown in FIG. 8 by using the control unit 20; to secondly operate the translucent proximity switch of the signal-transmitting section 24(n−1) and the signal-receiving section 24(n−1)'; accordingly to operate each sensor 24(n−1), . . . , 24c, 24b, 24a sequentially; and finally to check the outputs of each sensor 24n'–24a' by using the control unit 20 in order to check whether there is a person or an obstacle in the moving space of the doors. In the embodiment shown in FIG. 8A, only if a switching control signal for switching each sensor is transmitted to the distributor 22 from the control unit 20, it is possible to perform the remaining signal processing by a unit located at the side of the door 5. Therefore, it is possible to omit a plurality of signal cables for connecting between the door 4 and the door 5.

Figure 9:
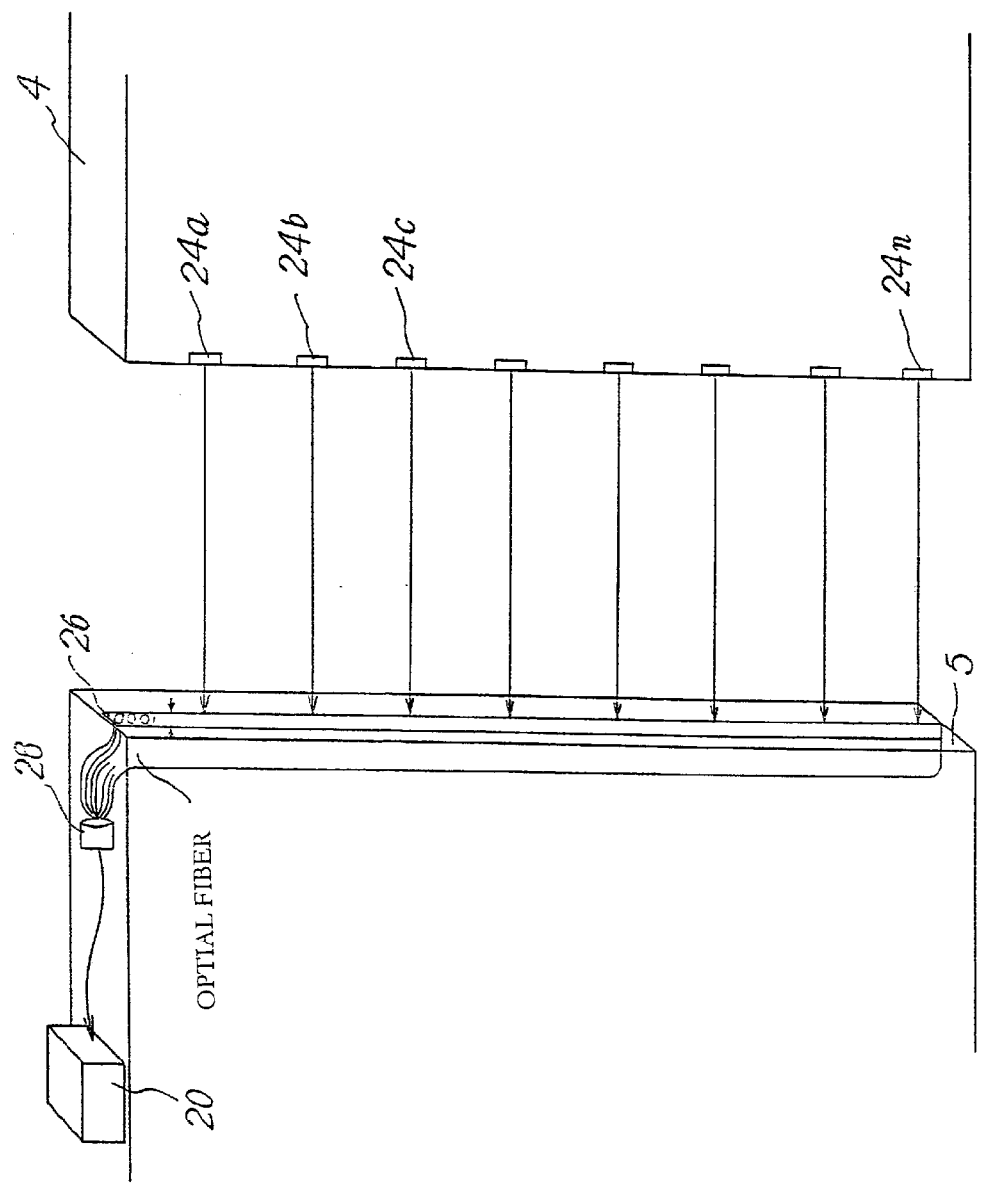
FIG. 9 is a block view showing another example of the present invention wherein the translucent type non-contact switch is used.

FIG. 9 shows another embodiment of the present invention. Each apparatus where the same reference number is attached performs the same function. With respect to a translucent optical proximity switch, signal-receiving/light-receiving sections are buried at the mating face with having optical fibers 26 rectilinearly strip-like arranged. Therefore, the ot her ends of the optical fibers 26 are connected to a light-receiving unit 28. Therefore, the number of sensors located at the signal-receiving side can be reduced, and then, an aesthetic feeling with respect to the appearance of the doors can be enhanced. With respect to the door safety system having the above construction, after the opening and closing door 4 or 5 is opened, each signal-transmitting/light-emitting section 24n, 24(n−1), . . . 24b, 24a is sequentially energized to transmit a signal and emit light. A control unit 20 checks the output signal from the light-receiving unit 28 in synchronism with the signal-transmitting/light-emitting sections emitting light. Therefore, it is possible to provide a door safety system which will never pinch a person or an obstacle, who or which is passing between the doors, even if the person or the obstacle stops in the moving area of the opening and closing doors 4, 5.

Figure 10:
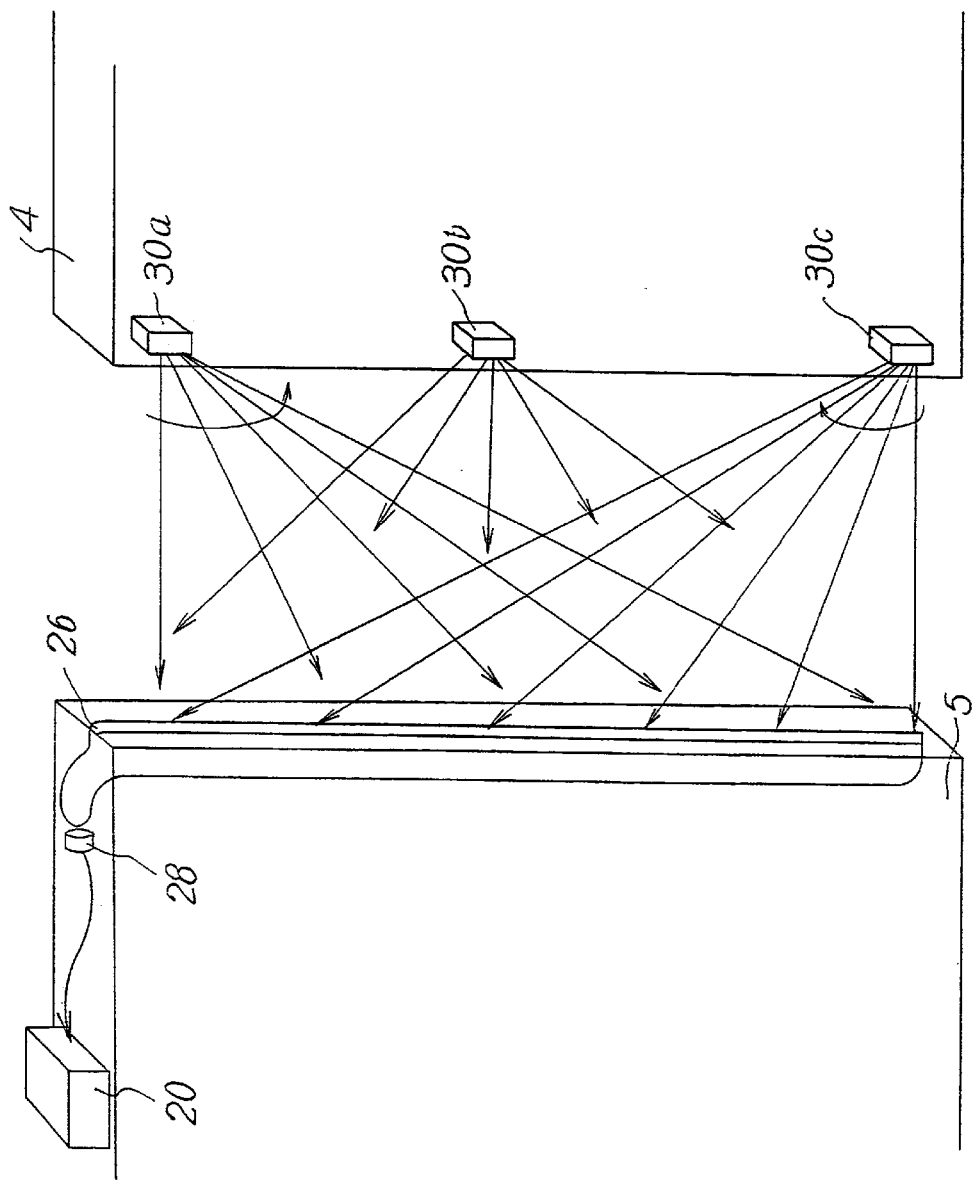
FIG. 10 is a block view showing another example of the present invention wherein another translucent type non-contact switch is used.
Figure 11A:
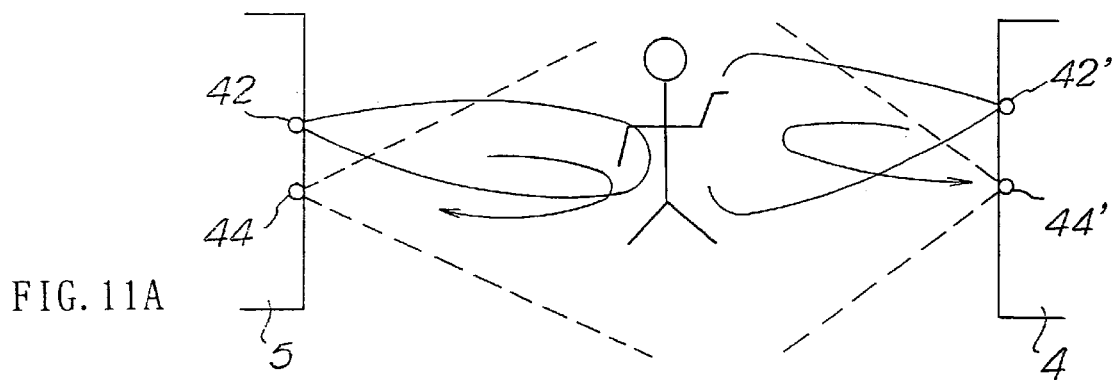
FIGS. 11A to 11D are views for explaining the problems caused when a reflex type non-contact switch is used during the movement of the door.
Figure 11B:
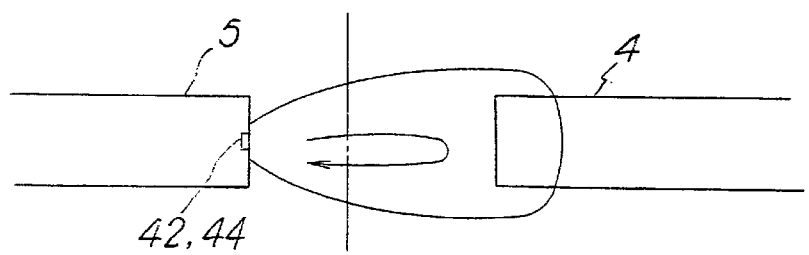
Figure 11C:
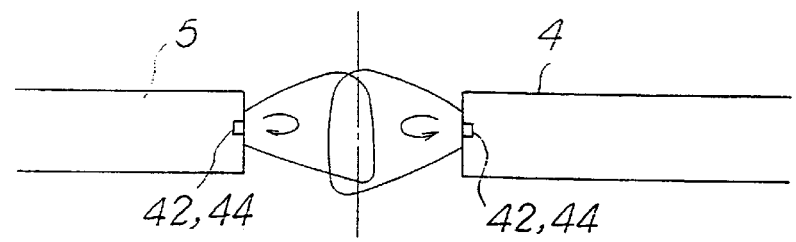
Figure 11D:
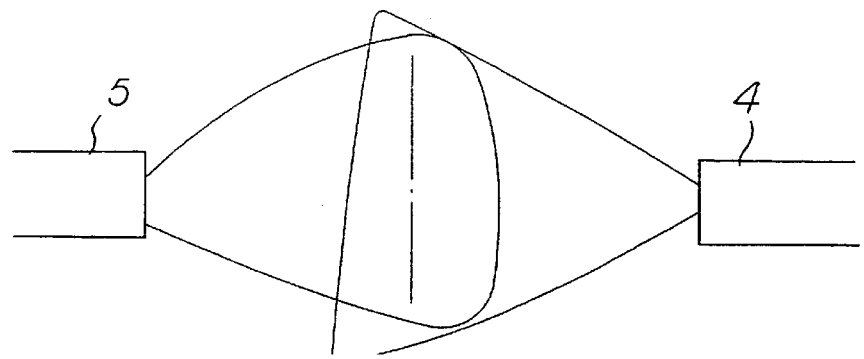

FIG. 10 shows another embodiment of the present invention. Each apparatus where the same reference number is attached performs the same function. With respect to a translucent type optical proximity switch, optical fibers 26 are used as light-receiving sections, and optical scanning units for scanning laser light 30a–30c are used as signal-transmitting/light-emitting sections. Therefore, the number of light-emitting sections is reduced. With respect to the door safety system having the above construction, after the opening and closing door 4 or 5 is opened, each optical scanning unit is sequentially energized to transmit a signal and emit light. Then, it is judged whether there is an obstacle which shades the light by checking the condition of the received light based on an output signal of a light-receiving unit 28. Therefore, it is possible to provide a door safety system, which never pinches a person or an obstacle, who or which is passing between the doors, even if the person or the obstacle stops in the moving area of the opening and closing door 4 or 5.

As the translucent non-contact proximity switch, an optical proximity switch or an infrared-type proximity switch is advantageous in that the system itself is miniaturized, in that it is possible to mount the switch on an automatic door having a very thin thickness being about 10 mm, and in that the switch is operable even when the distance between the doors is less than 2–3 mm. Furthermore, the translucent type non-contact proximity switch can operate until when the doors are perfectly closed.

Secondly, if an optical or an infrared proximity switch or an ultrasonic proximity switch, and a reflex type non-contact proximity switch (or sensor), which is constructed as a millimeter wave radar sensor by combining a signal transmitting section 42 and a reflected signal receiving section 44, are mounted on moving doors, there is the following problems, as shown in FIG. 11. Namely, as shown in FIG. 11A, since the reflex type proximity switch receives and processes a reflected signal of a transmitted signal, a signal level of the received signal is ¼–1/10 of the translucent proximity switch. Therefore, in order to detect the person or the obstacle continuously, it is necessary to transmit a stronger signal from the signal transmitting section 42. However, as shown in FIG. 11B, if a signal transmitted from the signal-transmitting section 42 becomes stronger, reflected signal waves reflected from the other door or the building are received. Therefore, conventionally, there was no example where the reflex type non-contact proximity switch was provided at the automatic doors which move relatively fast (1–2 m/sec) and where the sensor is operated to detect the person or the obstacle when the doors are moving.

Therefore, the inventor of the present application provided a reflex type non-contact proximity switch at a contact surface, where the doors contact each other when they are closed. In a case shown in FIG. 11C, the signal level transmitted from the signal-transmitting section 42 is decreased, and then, a detectable range for detecting an obstacle is set at a distance shorter than the distance between the doors. In a case shown in FIG. 11D where there is a long distance between the doors, it is found that the reflex type non-contact proximity switch can be used by increasing the signal-transmitting level of the signal-transmitting section 42 so that the other door is not detectable.

Figure 12:
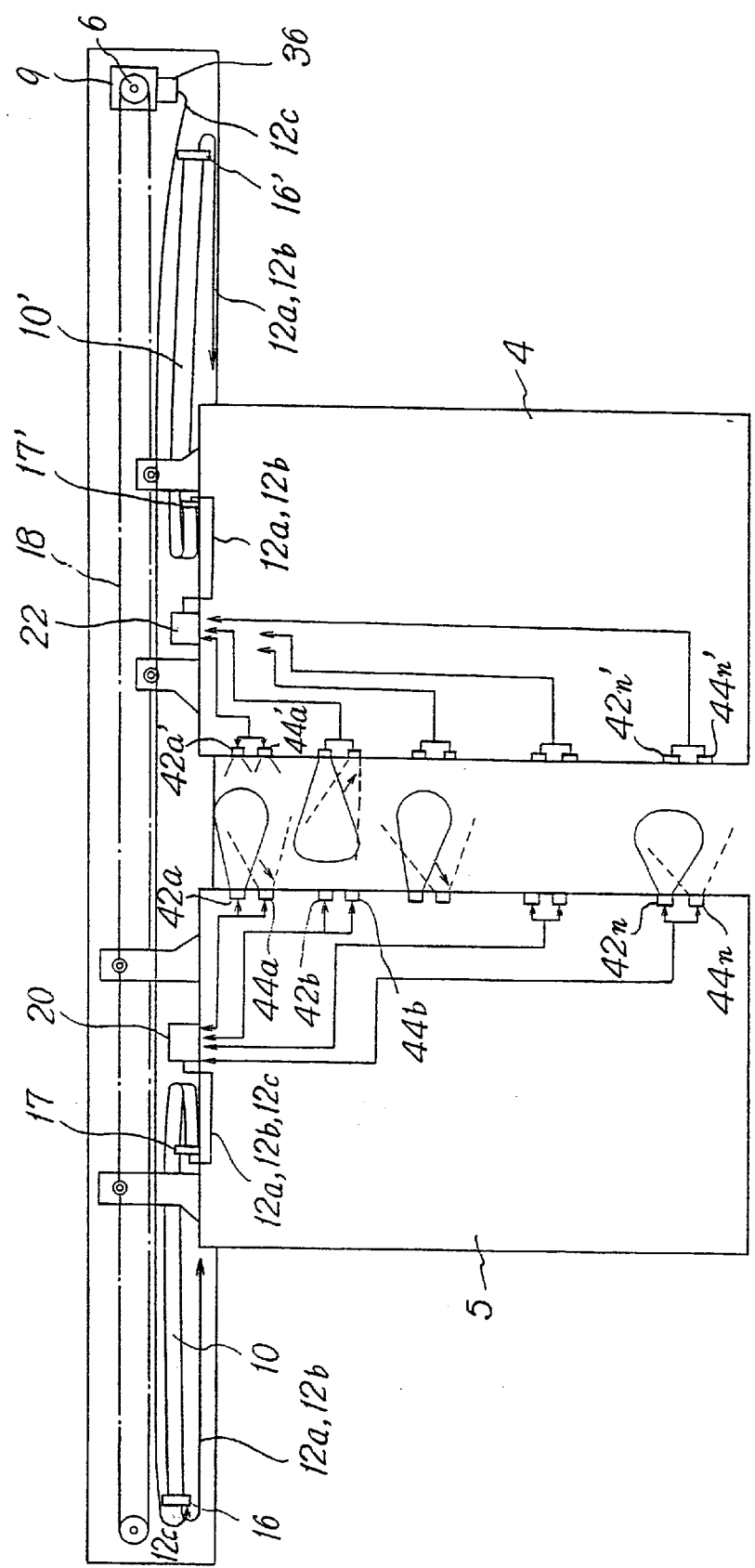
FIG. 12 is a block view showing an example of the present invention wherein a translucent and a reflex type non-contact switches are used.

FIG. 12 shows another embodiment of the present invention. Each apparatus where the same reference number is attached performs the same function. At the mating faces (contact surfaces) of doors 4 and 5, there are provided with reflex non-contact proximity switches 42a–44a, 42b–44b, - - - 42n–44n, and 42a'–44a', 42b'–44b', - - - 42n'–44n'. Each non-contact proximity switch is controlled by a control unit 20. A position signal is sent to the control unit 20 through a cable 12c from a position measuring unit 36 connected to a belt driving unit 9, and then, distance information between the doors can be measured. It is preferable that signal-transmitting levels of the non-contact proximity switches 42a–42n and 42a'–42n' can be controlled from the outside. As the position measuring unit, there is a measuring unit for measuring the distance between the doors based on the received signal level of an optical-type, an ultrasonic-type, an infrared-type, or a millimeter wave-type non-contact proximity switch, which previously measures and stores the received signal level according to each distance with having output level of the signal-transmitting section of the translucent non-contact proximity switch constant and indirectly calculates distance information based on the received signal level of the translucent non-contact proximity switch; or a measuring unit for measuring the distance between the doors according to the software processing of the control unit 20, which calculates the distance between the doors by using a rotary encoder or a linear encoder.

Figure 13:
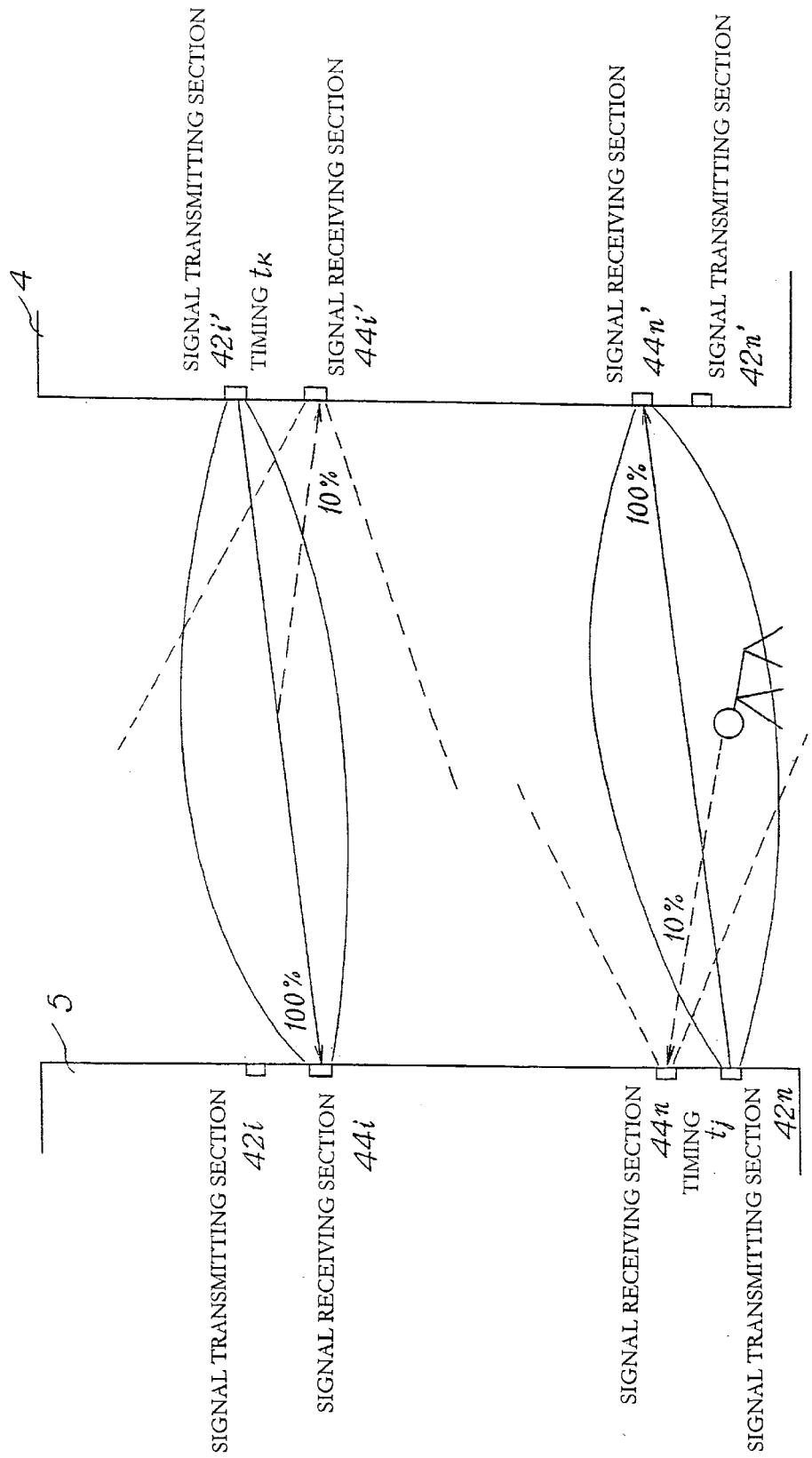
FIG. 13 is a conceptual view for explaining the operation of a signal transmitting section and a signal receiving section.

Furthermore, in a case of automatic doors where a plurality of reflex type non-contact proximity switches are arranged at mating faces of the doors as shown in FIG. 12, the driving efficiency or performance is not good if each proximity switch operates separately. Therefore, according to the present invention, as shown in FIG. 13, a signal transmitted from a signal-transmitting section 42n of a non-contact proximity switch mounted on the left door is directly inputted as a transmitting signal to a signal-receiving section 44n'. A signal transmitting section 42n and a signal-receiving section 44n' constitute a translucent type non-contact proximity switch, and then a signal-transmitting section 42n and a signal receiving section 44n constitute a reflex type non-contact proximity switch. Each output signal received by each receiving element such as an ultrasonic wave-receiving unit, a radar-receiving unit is respectively inputted to each amplifier having a different amplification factor. After the amplification processing, if detection levels for detecting a person or an obstacle are separately predetermined with respect to a translucent mode and a reflex mode, it is possible to simplify the circuit arrangement.

The operation of the above apparatus according the present invention will be described hereinafter with reference to FIG. 14 and FIGS. 16A–16D.

Firstly, the order of the signal-transmitting timing with respect to each proximity sensor is predetermined and stored in a predetermined memory area (Step S2). Namely, in the case of FIG. 12, as shown in FIG. 15, firstly, a detection signal such as visible light, infrared ray, ultrasonic light, millimeter wave, is projected from the signal-transmitting section 42n, which is located at the lowest stage of the door 5, to the signal-receiving section 44n' located at the right side door. Therefore, the signal-receiving section 44n mounted on the door 5 becomes a stand-by status, if an amplification factor of an amplifier provided at a receiving-sensor of the signal-receiving section is set at a reflex mode, where the amplification factor is three or several ten times more than that of a normal-translucent mode. On the other hand, the signal-receiving section 44n' mounted on the door 4 becomes a stand-by status, if an amplification factor of an amplifier provided at a receiving-sensor of the signal-receiving section 44n' mounted on the door 4 is set at a translucent mode.

Secondly, with respect to an example shown in FIG. 15, a detection-signal is projected from a signal-transmitting section 42c' located at the middle stage of the door 4 to a signal receiving section 44c of the door 5. Therefore, an amplification factor of an amplifier provided at a receiving-sensor of the signal-receiving section 44c' mounted on the door 4 is set at a reflex mode. An amplification factor of an amplifier provided at a receiving-sensor of the signal-receiving section 44c mounted on the door 5 is set at a translucent mode. Thirdly, a signal transmitting section 42(n–1) mounted on the door 5 is energized to transmit signal, and then, fourthly a signal-transmitting section 42a' mounted on the door 4 is energized to transmit signal. Accordingly, a signal-transmitting section mounted on the door 5 or a signal-transmitting section mounted on the door 4 is alternatively and sequentially energized to transmit signal. Therefore, the space between the door 4 and the door 5 can be checked or detected randomly and uniformly. Furthermore, with respect to the automatic door system, the possibility that the lower part of the automatic door collides with a person or an obstacle is higher than the possibility that the upper part of the automatic door collides with a person or an obstacle. Therefore, it is more preferable to check uniformly and mainly the lower moving space of the automatic door than sequentially scanning the moving space from the upper part to the lower part or vice versa. Then, a test operation is performed by the control unit 20. For example, the distance between the door 4 and the door 5 is controlled at regular intervals, i.e. 10 cm. With respect to each distance, for example, a signal transmitting section 42i is energized to transmit signal having a predetermined signal level. The transmitted signal is received by a signal-receiving sensor 44c' located at the opposite side, a signal level of the transmitted signal is stored, and then information with respect to the correspondence between the distances between the doors and the signal levels is collected (Step S2). The collection of the information may be performed a plurality of times at the time of the test operation, or it may be possible to store the information after collecting the information by performing another test for measuring the transmitted signal level with respect to predetermined distances between the doors.

Accordingly, the order of the proximity sensors to be energized is determined. After the collection of information is terminated, an operation mode for operating the automatic doors is started. In the case of the operation mode, firstly, information with respect to distances between the doors is measured by the position-measuring unit 36 (Step S4). Secondly, the signal level outputted from the signal-transmitting section is determined according to the information (Step S6). It is preferable to control the signal level so that the signal level is increased if the distance is long, and so that the signal level is decreased if the distance is short, as far as the receiving section is not operated by receiving signal waves reflected by the opposite door or the building.

Next, the signal-receiving section 44n' mounted opposite to the signal-transmitting section 42n, which is registered at the first place of the registration table, is set at a translucent mode. Then, after the signal receiving section 44n is set at the reflex mode, the signal transmitting section 42n is turned on (Step S8 and Time t1 of FIG. 16A).

If an obstacle is detected according to the signal outputted from the signal-receiving section 44n', which is set at the translucent mode, or the signal-receiving section 44n, which is set at the reflex mode, (Step S10), a control signal for controlling the opening of the doors is outputted (Step S12), and then, the operation is returned to Step S4. If the obstacle is not detected according to the received signal level outputted from the signal-receiving section 44n' or 44n, the same processes as the above (Steps S4–S12) are repeated with respect to the second signal-transmitting/signal-receiving section, which is registered at the second place of the registration table. It is preferable that the signal-transmitting sections are energized to transmit signal from the lower side-stage randomly. When the registration table as shown in FIG. 15 is scanned perfectly, the operation is returned to the first registered signal-transmitting section, and then, the above processes are repeated until when the doors are perfectly closed or the obstacle is detected. Furthermore, as shown in FIG. 15, the same combination, i.e. the same signal-transmitting section and the same signal-receiving section may be registered in the registration table several times. Because of the same combination being registered, it is possible to detect the obstacle by focussing more on the lower moving space of the automatic doors than the upper moving space thereof. Therefore, this is effective for detecting a child and an aged person.

Next, a position measuring unit 36 such as an encoder/a linear scale, and a method/an apparatus, which uses different position measuring methods, for detecting a person/an obstacle will be explained hereinafter. There are two different position-measuring methods. According to the first method, a signal-transmitting level and a signal-receiving level are corrected by measuring absolute distance between the doors as well as the encoder. According to the second method, the signal-transmitting level and the signal-receiving level are corrected based on the relative distance between the doors.

Figure 17:
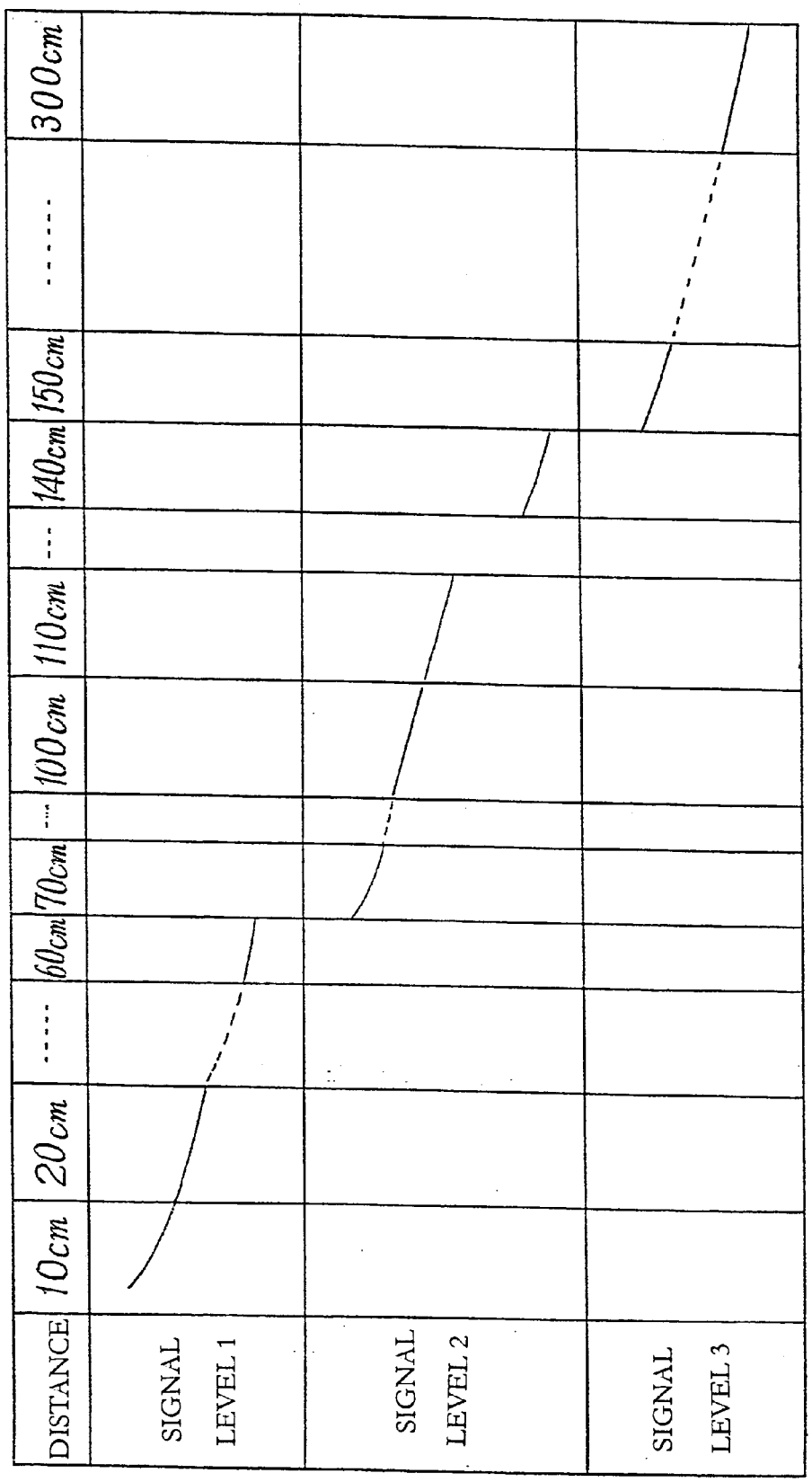
FIG. 17 is a view showing the relation between a distance between doors and a receiving level.

As an example for computing the absolute distance between the doors, distance information is calculated based on signal level outputted by a proximity sensor set at the translucent mode. Therefore, by performing another test previously, received signal data is measured at 10 cm intervals with respect to a representative distance between the doors, and then, a table with respect to a relation between the distance and the signal level is prepared. Namely, as shown in FIG. 17, by using a signal having signal-level 1, translucent signal-receiving level is measured and stored with respect to the distance between the doors being from 10 cm to 60 cm. And then, by using a signal having signal-level 2 greater than signal-level 1, translucent signal-receiving level is measured and stored with respect to the distance between the doors being from 70 cm to 140 cm. Finally, by using a signal having signal-level 3 greater than signal-level 2, translucent signal-receiving level is measured and stored with respect to the distance between the doors being from 150 cm to 300 cm.

Figure 18:
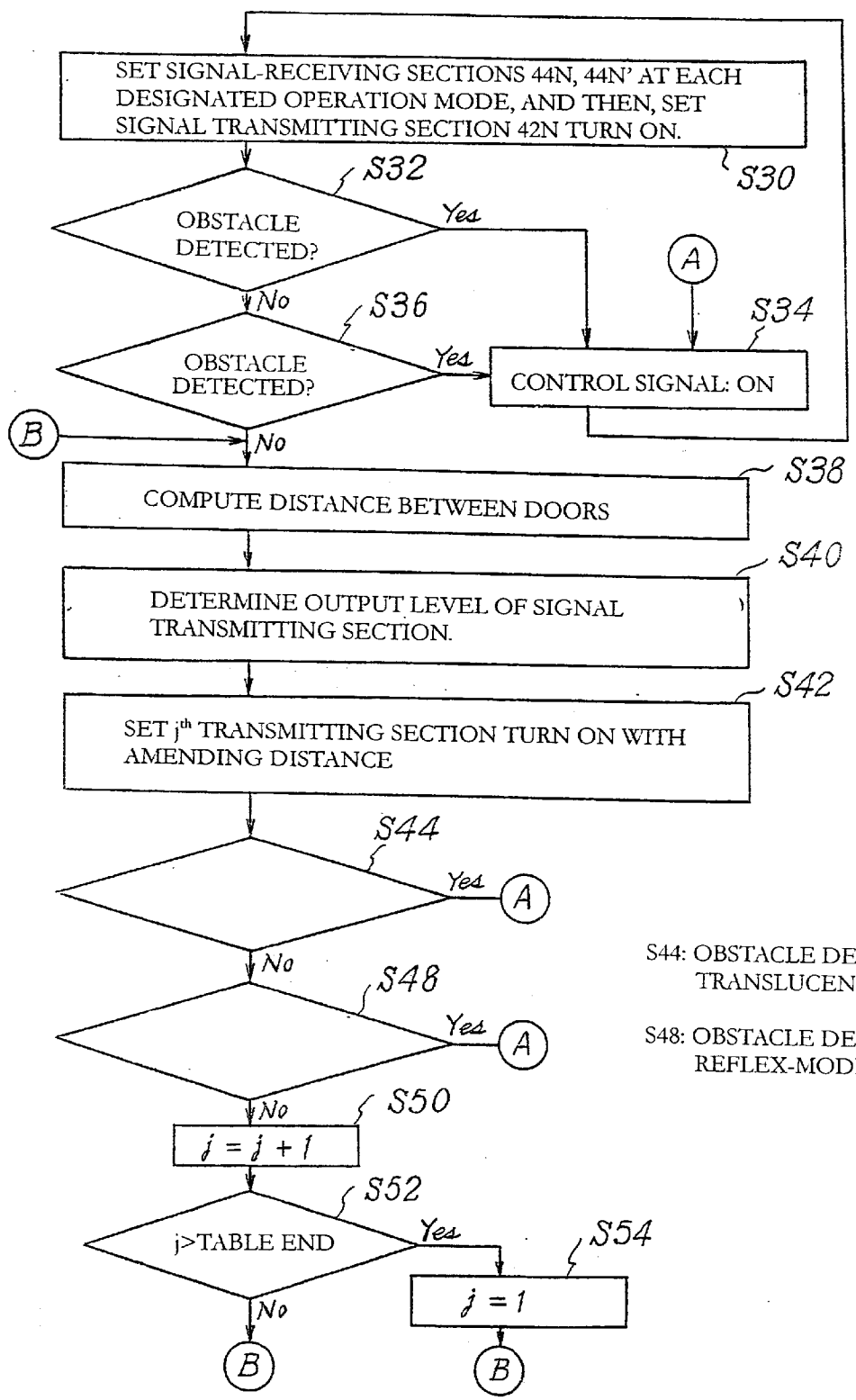
FIG. 18 is a flowchart showing the operational example of an example of operation of the apparatus shown in FIG. 12.

Next, in a case of person/obstacle detecting mode, the distance between the doors being opened perfectly can be measured and stored. The person or the obstacle is detected during the door-closing operation. It is not detected during the door-opening operation. After a control signal for opening the doors is turned on and the doors are opened perfectly, the operation for detecting the person or the obstacle during the door-closing operation will be explained hereinafter with reference to a flowchart shown in FIG. 18. Firstly, the first signal-receiving sections 44n, 44n' shown in a scanning sequence registration table of FIG. 15 are respectively set at each designated operation mode. A transmitted signal level, which corresponds to the distance between the doors being opened perfectly, is selected according to a table, shown in FIG. 17, with respect to the relation between the distance and the received signal level, and then, the signal-transmitting section having a transmitted signal level is turned on (Step S30). Next, a received signal level of the signal-receiving section, which is set at the translucent mode, is checked by the control unit 20, and if the received signal level is less then a predetermined threshold value, it is judged that a signal transmitted from the signal-transmitting section is interrupted by the person or the obstacle (Step S32), and then, the control signal for opening the doors is turned on (Step S34). On the other hand, if the received signal level is greater than the predetermined threshold value, the received signal level of the signal-receiving section, which is set at the reflex mode, is checked by the control unit 20, and then, if the received signal level is greater than a different threshold value, which is separately set for the reflex mode, it is judged that the signal waves are reflected from the person or the obstacle, and therefore, a control signal for opening the doors is turned on (Step S34).

Next, if the person or the obstacle is not detected by using the two different received-signal levels, i.e. one for the translucent mode and the other for the reflex mode, the distance between the doors is detected based on the table shown in FIG. 17 according to the received signal level of the signal receiving section set at the translucent mode (Step S38). The transmitted signal output level of the next signal-transmitting section (j) shown in FIG. 15 is determined according to the information with respect to the distance between the doors (Step S40). It is judged by the control unit 20 whether or not the transmitted signal level is decreased or not during the door-closing operation. If the $j^{th}$ transmitted signal output level is determined, the $j^{th}$ signal-transmitting sections are respectively set at the designated translucent mode and the designated reflex mode. With respect to the $j^{th}$ signal-transmitting sections, the distance is amended by using the $j^{th}$ transmitted signal output level, and the $j^{th}$ signal-transmitting sections are turned on (Step S42). Next, the received-signal level of the signal-receiving section 44j set at the translucent mode is checked by the control unit 20. If the received-signal level is less than a predetermined threshold value, it is judged that the translucent signal waves are interrupted by a person or an obstacle (Step S44), and then, a control signal for opening the door is turned on. Furthermore, the received-signal level of the signal-receiving section 44j' set at the translucent mode is also checked by the control unit 20. If the received-signal level is greater than a predetermined threshold value, it is judged that signal-waves are reflected by a person (Step S48), a control signal for opening the door is turned on. If a person or an obstacle is not detected by using either one of the above two received signal levels, i.e. the received signal level of the translucent mode, and the received signal level of the reflex mode, the distance between the doors is calculated based on the received signal level of the signal-transmitting section set at the translucent mode. For checking the next signal transmitting/signal receiving sections, j is replaced by j+1, and then, the above steps S38–S48 are repeated. Therefore, with respect to the arrangement of sensors of the signal-transmitting/signal-receiving sections shown in FIG. 12, it is possible to calculate the information with respect to the distance of the doors based on the signal level outputted from the signal-receiving sensor set at the translucent mode without using a position measuring unit such as an encoder, a linear scale, and to detect a person or an obstacle without any effect of the other door by amending the distance between the doors based on the transmitted signal level of the signal transmitting section.

Figure 19:
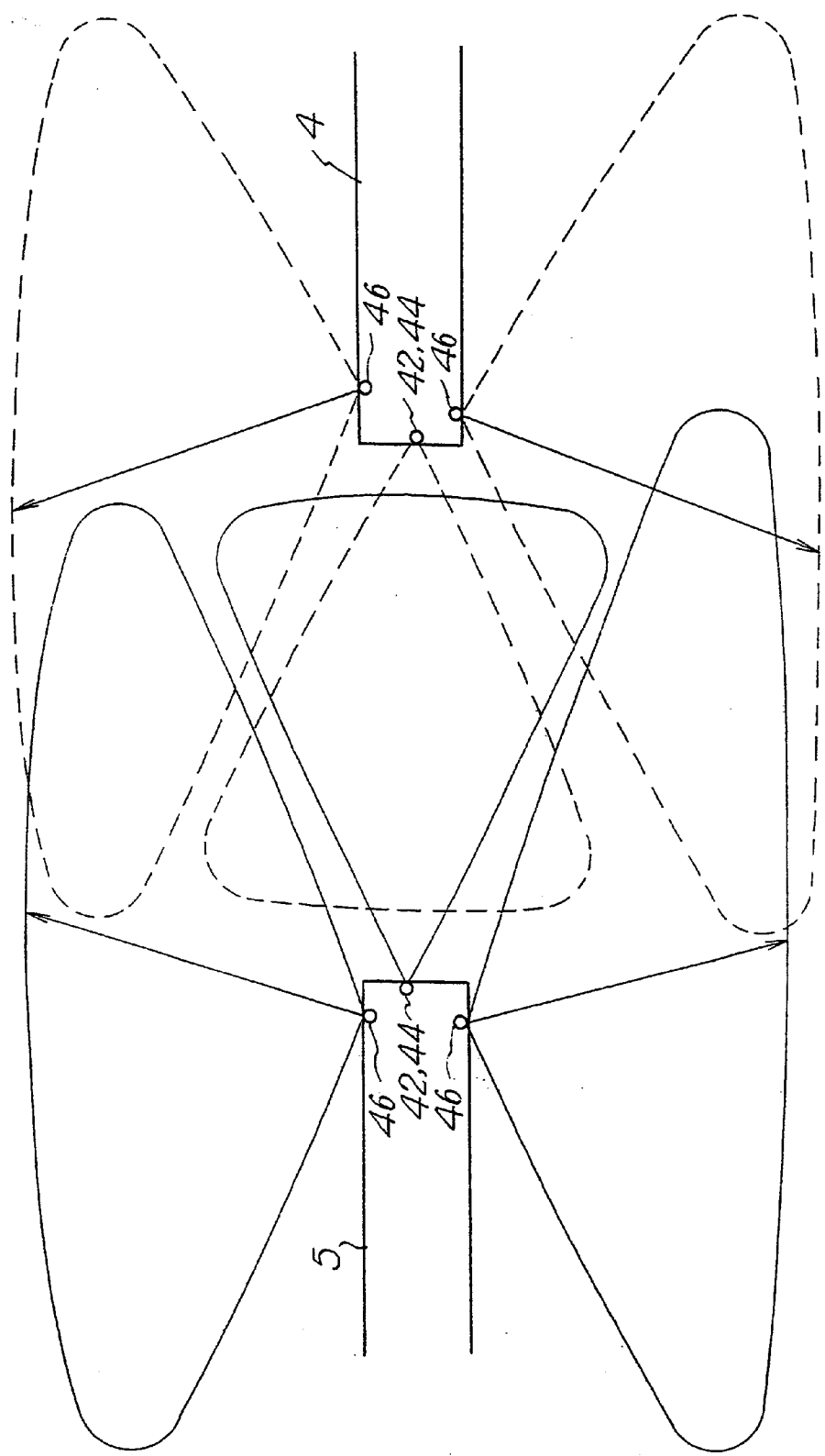
FIG. 19 is a view showing an example of a safety search space used for an automatic door.
Figure 20:
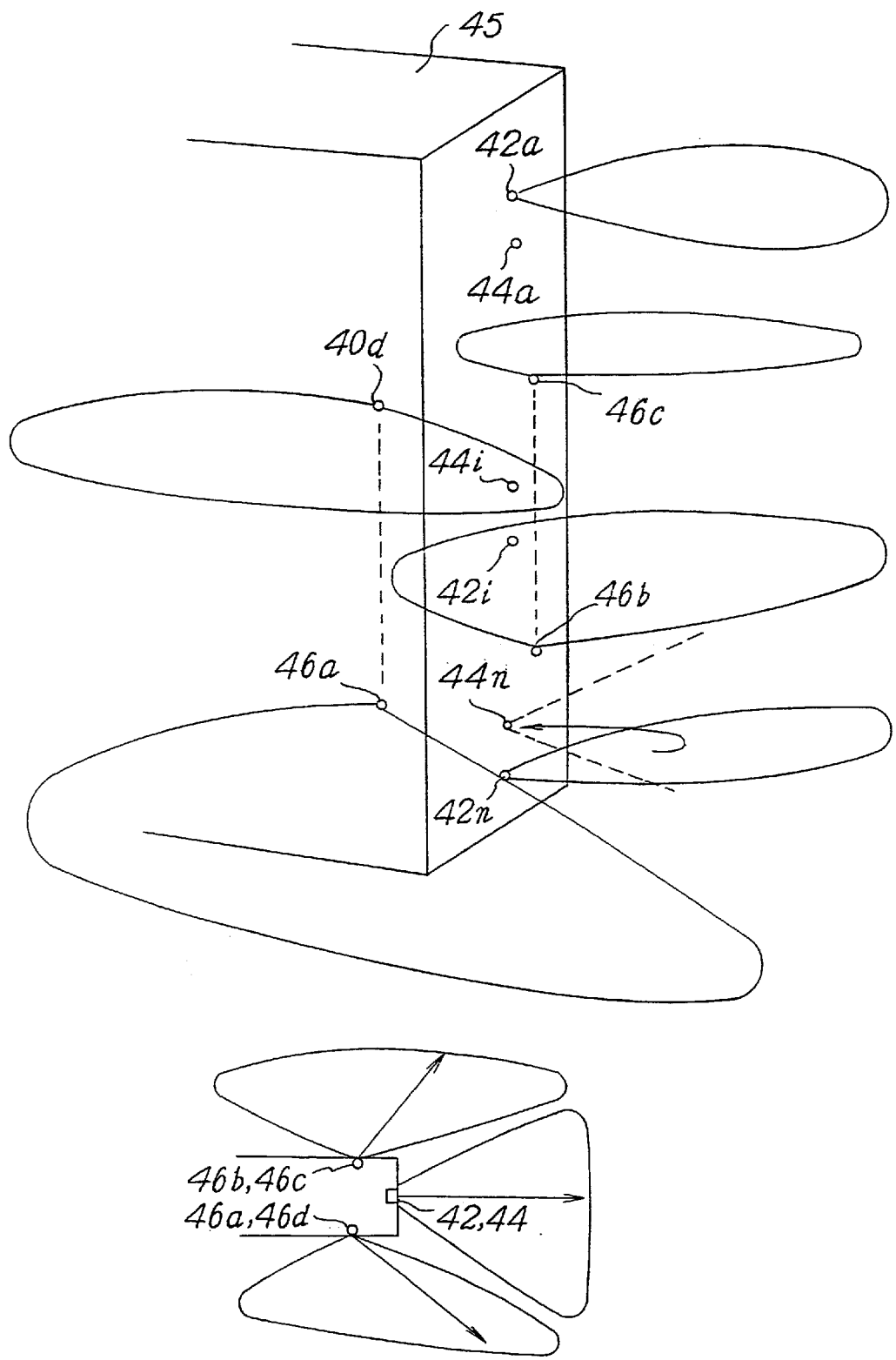
FIG. 20 is a view for explaining the direction to which a non-contact switch/sensor is mounted with respect to the safety search space.
Figure 21:
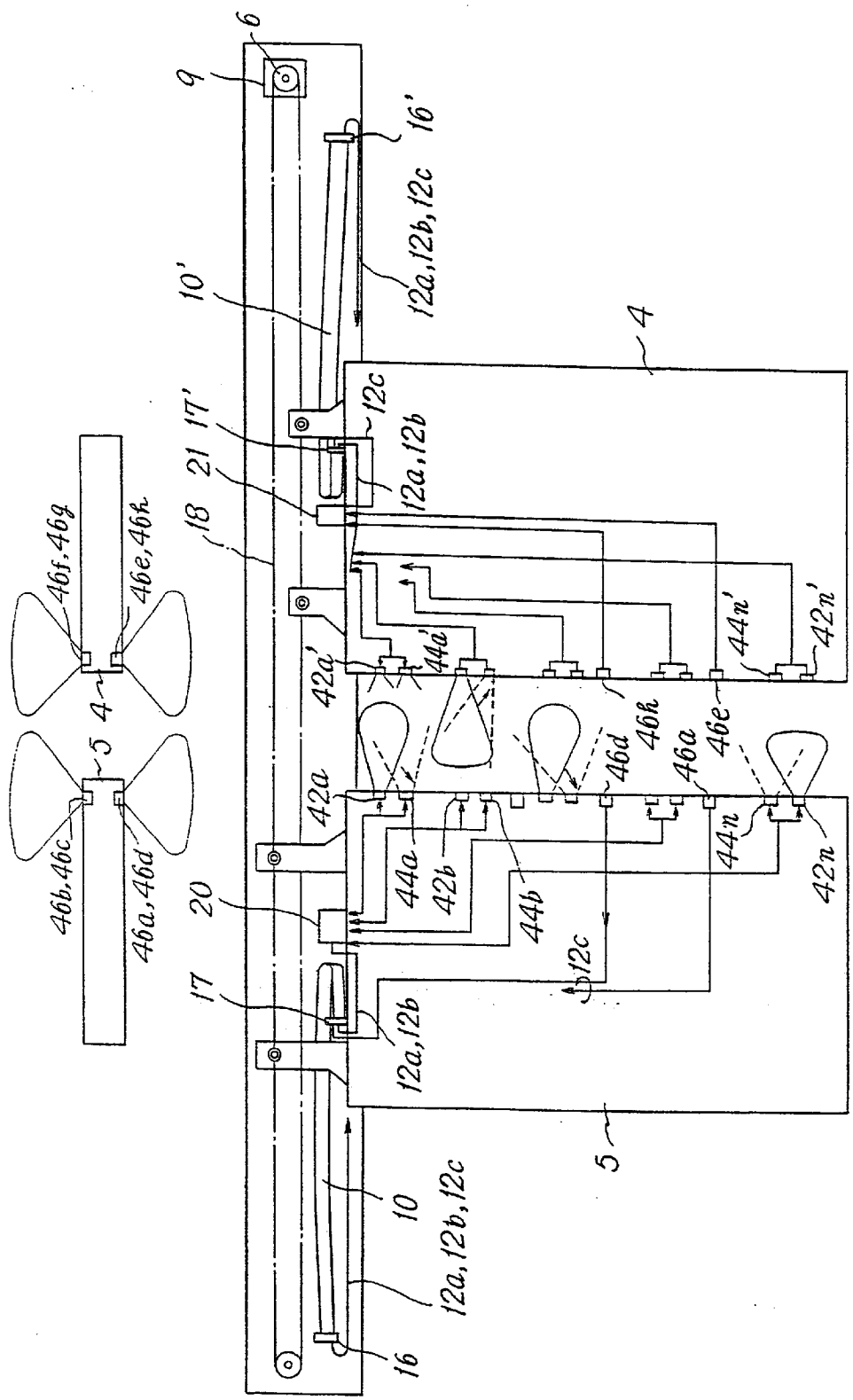
FIG. 21 is block view showing an example of the door safety system.

FIGS. 19–21 show another operation principal of the present invention. Namely, FIGS. 19–21 show an example of door safety system used for automatic door, which can detect a person getting near the door even if the doors are opened perfectly. With respect to the present example, there are provided with translucent and reflex non-contact proximity sensors, which are mounted at the mating sides of the doors and which prevent a person passing through the doors or just standing between the doors from being caught by the closing doors, as well as the example shown in FIG. 12; and a translucent type non-contact proximity sensor 46 having directivities directed to an entrance direction and an exit direction. In this example, without any repair works with respect to posts, floor, and ceiling, the door safety system for automatic door can be provided.

An optical reflex type proximity sensor, an infrared reflex type proximity sensor, an ultrasonic reflex type proximity sensor, or a millimeter wave radar sensor can be used as the translucent non-contact proximity sensor 46 having directivities directed to an entrance direction and an exit direction. However, any kind of sensor, which can detect a person or an obstruct getting near within three meter from the sensor, may be used. With respect to reflex type non-contact proximity sensors 46a–46d and 46b–46c shown in FIG. 20, the sensors may be arranged so that with respect to the doors 4, 5, respectively, one sensor is directed to an exit direction and another sensor is directed to an entrance direction. Alternatively, the sensors may be arranged so that a plurality of sensors are directed to the exit direction and a plurality of sensors are directed to the entrance direction. Furthermore, the outputs of the reflex type proximity sensor 46a–46h may be checked by the control unit 20 at regular intervals. By providing another control unit 21, the outputs of the proximity sensors 46a–46h may be checked. Furthermore, there may be provided with infrared-type proximity sensors at the mating sides of the doors, and with ultrasonic reflex-type proximity sensors directed to the exit direction and to the entrance direction. Therefore, the interference of signal waves, which take place if sensors directed to the exit or the entrance direction and sensors directed to the mating side direction have the same wavelength, can be avoided by providing the infrared type proximity sensors at the mating side and ultrasonic reflex-type proximity sensors directed to the exit or the entrance direction.

An example of the door safety system used for automatic door system based on the above operation principle will be explained in detail with reference to FIGS. 21 and 22. FIG. 21, which corresponds to FIG. 12, shows another example of the present invention. The apparatus, where the same reference number is attached, performs the same function. The distance between the doors is relatively amended so that the received signal level of the translucent non-contact proximity sensor mounted on the translucent type non-contact proximity sensor is constant. Therefore, the position-measuring unit such as the encoder/linear scale required for the apparatus shown in FIG. 12 is not required. Reflex type non-contact proximity sensors 46a–46h are arranged respectively at the exit and entrance sides of the doors 4 and 5. The outputs of the non-contact proximity sensors 46a–46h are checked by the control unit 21. In a case of the construction of FIG. 21, infrared type proximity sensors are used for translucent-type/reflex-type non-contact proximity sensors 42a–44a, 42n'–44n' mounted at the mating side, and ultrasonic-type proximity sensors are used for reflex-type non-contact proximity sensors 46a–46h mounted at the exit and entrance sides.

Figure 22:
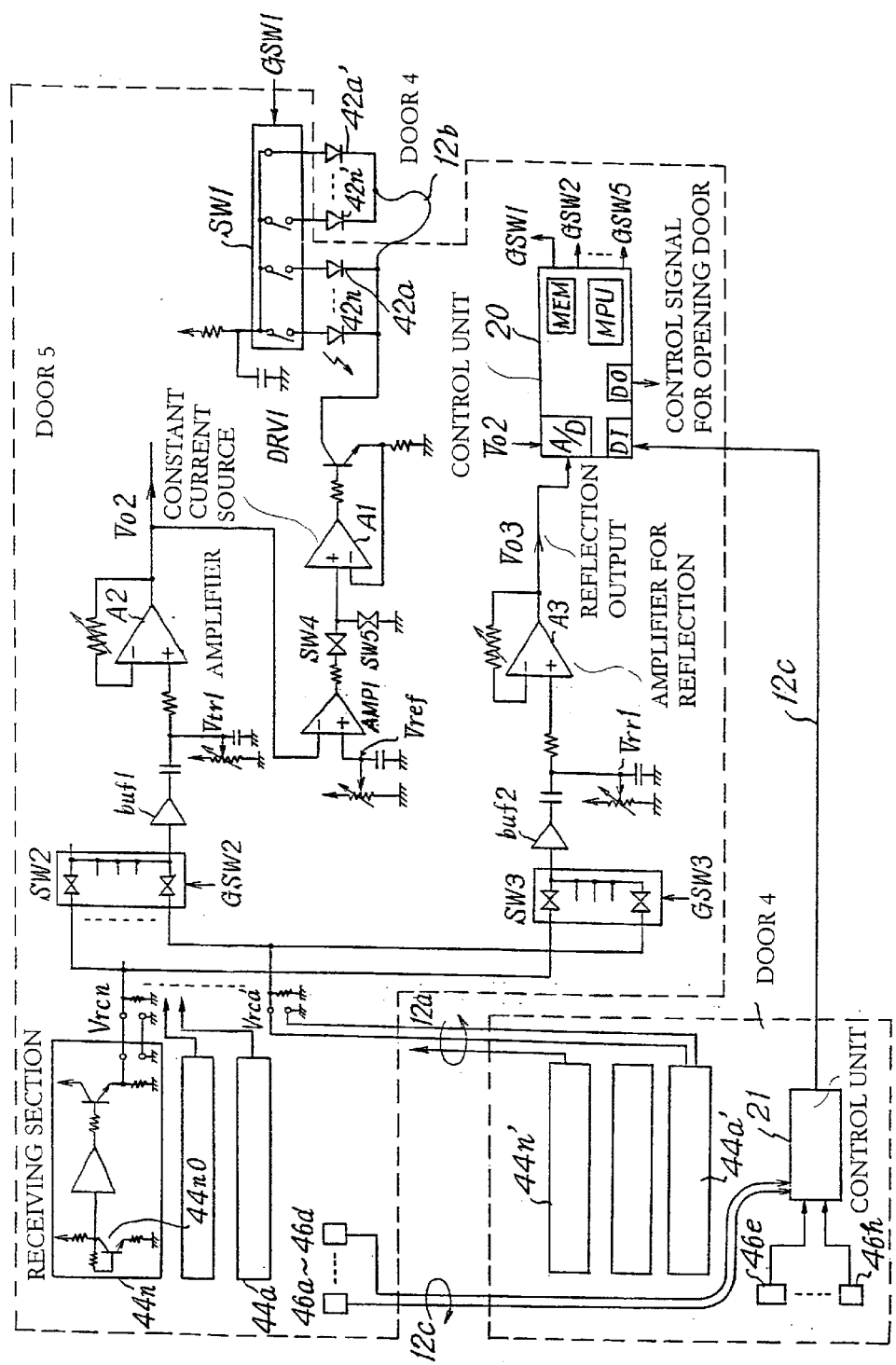
FIG. 22 is a circuit view showing an example of a signal processing.

FIG. 22 shows an electric circuit diagram. In the diagram, the apparatus with the same reference number performs the same function. The output of a constant current source A1 drives a driver DRV1. Namely, the output drives a signal-transmitting/light-emitting section 42i, which is selected by a switch SW1 based on a selection signal GSW1 outputted from a control unit 20. The translucent signal waves are received by a corresponding signal-receiving section 44i', and the output thereof Vrci' is inputted to an amplifier A2. The output Vo2 of the amplifier A2 is connected to an input of an A/D converter of the control unit 20, and inputted to a high gain amplifier AMP1, which compare the output Vo2 with a reference voltage Vref The output of the high gain amplifier AMP 1 is feedback to the constant current source A1 via a switch SW4. The received signal output Vrci of the reflected signal waves are inputted to an amplifier A3 via a switch SW3 and a buffer buf2. The output Vo3 of the amplifier A3 is connected to an input of an A/D converter of the control unit 20. Furthermore, signal transmitting sections 42a'–42n' mounted at the door 4 and a switch SWI are connected by a cable 12b covered by a cable guide 10. Signal receiving sections 44a'–44n' mounted at the door 4 and switches SW2 and SW3 are connected by a cable 12a. Furthermore, the received signal levels of ultrasonic reflex type proximity sensors 46a–46h are checked by a control unit 21 provided at the door 4. The output of the control unit 21 is transmitted via a cable 12c to the control unit 20.

The operation of the apparatus having the above construction will be explained hereinafter. With respect to the embodiment shown in FIGS. 21 and 22, ultrasonic reflex-type non-contact proximity sensors 46a–46h for driving the doors are always active condition. The control unit 21 immediately detects whether or not a person or an obstacle is getting near the door 4 or 5. If the person or the obstacle is getting near the door 4 or 5, the control unit 21 transmits a detecting signal to the control unit 20, and then a signal for opening the door is outputted.

On the other hand, proximity sensors from 42a–44a to 42n'–44n' for safety arranged at the mating sides and reflex type non-contact proximity sensors 46a–46h for driving the doors operate independently. According to the order registered in the scanning sequence table shown in FIG. 15, each signal-transmitting/signal receiving section of the proximity sensors for safety is respectively set at the active condition. The proximity sensors for safety detect whether a person or an obstacle is getting into an insensible area of the proximity sensors for driving the doors. Therefore, according to the proximity sensors for driving the doors, the control signal for opening the doors is turned on. The proximity sensors for safety is sequentially set at the active condition from the time when the doors start closing after when the doors are opened perfectly, to the time when the doors are closed perfectly.

The operation of the proximity sensors for safety shown in FIGS. 21, 22 will be explained hereinafter with reference to the order of the registration table shown in FIG. 15. Firstly, when the doors start closing, the control unit 20 reads information with respect to the first signal-transmitting section and the first signal receiving section. According to the selection signal GSW1, a signal-transmitting/light-emitting device is selected via the switch SW1. Secondly, according to the selection signal GSW2, the output of the signal-receiving section 44n' is connected via the switch SW2 to the amplifier A2, and according to the selection signal GSW3, the output of the signal-receiving section 44n is connected to the amplifier A3. Thirdly, according to the signals GSW4, GSW5, the switch SW4 is turned on, and the switch SW5 is turned off. Accordingly, a feedback loop of the translucent type proximity sensor 42n–44n' is completed. If the reference voltage Vref of the amplifier AMP1 is set to be greater than a reference voltage Vtr1 of the amplifier A2, the amplifier AMP1 outputs a great output, and then, via the constant current source A1, the signal-transmitting section transmits signal (emits light) with great output. Then, the signal-receiving device of the signal-receiving section 44n' supplies a great output Vrcn' to the amplifier A2, and the output thereof supplies a small output. The smaller the output of the amplifier AMP1 becomes, the smaller the received signal output Vrcn' of the signal-receiving section 44n' becomes. If the received signal output Vrcn' is decreased, the output Vo2 of the amplifier A2 is decreased, and then it becomes lower than the reference input voltage Vref of the amplifier AMP1. If the output Vo2 is lower than the reference input voltage Vref, the output of the amplifier AMP1 supplies a great output, and then, the signal transmitting device 42n becomes a high signal transmitting level again. If the feedback process is repeated during a period determined by a time constant of the feedback loop, the output Vo2 of the amplifier A2 becomes equal to the reference input voltage Vref, and the output Vo2 becomes stable. Therefore, after a predetermined period, the outputs of the amplifier A2 and the amplifier A3 are inputted to the control unit 20 via an A/D converter. If the output Vo2 of the amplifier A2 is greater than a predetermined threshold value Vth2, it is judged that the translucent signal waves are not interrupted, and that there is no person or obstacle between the doors, and then, a control signal for opening the doors is turned on. Furthermore, the output Vo3 of the amplifier A3 is greater than a predetermined threshold value Vth3, it is judged that a lot of reflection signal waves reflected by the person or obstacle are detected, and then, the control signal for opening the doors is turned on. On the other hand, if the output Vo3 is smaller than a threshold value Vth3, it is judged that there is no person or obstacle between the doors. If the above process for detecting the person or obstacle by using the first signal-transmitting section and the first signal receiving section, a switch SW4 is turned off by signals GSW4, GSW5, and then, the switch SW5 is turned on. Therefore, the operation of the signal transmitting section 42n is terminated. The signal output level of the signal-transmitting/receiving section having the above construction is adjusted within 100 g second so that the reference input voltage Vref of the amplifier AMP1 is equal to the output Vo2 of the amplifier A2 without depending on the distance between the doors. Therefore, the signal transmitting/signal receiving sections can be made stable by relatively amending the distance between the doors within a short period even if the doors are rapidly moving.

Secondly, the information with respect to the second signal transmitting and receiving sections is read out from the registration table. With respect to the example shown in FIG. 15, the signal-transmitting section 42c' provided at the door 4 is registered. The signal transmitting/light-emitting device of the signal-transmitting section 42c' provided at the door 4 is selected via the switch SW1 by the selection signal GSW1. Then, according to the selection signal GSW2, the output Vrcc of the signal receiving section 44c provided at the door 5 is connected via the switch SW2 to the amplifier A2. According to the selection signal GSW3, the output Vrcc' of the signal-receiving section 44c' provided at the door 4 is connected to the amplifier A3. If the switch SW4 is turned on and the switch SW5 is turned off according to the signals GSW4, GSW5, a feedback loop of the translucent proximity sensors 42c'–44c is constructed. As described the above, after a predetermined period (normally 100 µ second), the outputs Vo2, Vo3 of the amplifiers A2, A3 are inputted to the control unit 20. The outputs Vo2, Vo3 is respectively compared with predetermined threshold values Vth2, Vth3, and it is detected whether there is a person or an obstacle between the doors. If the person or the obstacle is detected, the control signal for opening the doors is outputted.

The above registration table is read out, and then, according to the scanning order of the registration table, the steps of switching the switches and of checking the outputs of the amplifiers A2, A3 are repeated until the automatic doors are perfectly closed.

As explained the above, the door safety system according to the present invention provides a safety automatic door system, which prevents a person or an obstacle passing through the doors or just standing between the doors from being caught by the closing doors and which has no insensible area, since it is possible to detect the person or the obstacle by providing the translucent type non-contact proximity switch/sensor at the moving door without any effect of the opposite door or a wall of building. Additionally, by providing at the moving doors reflex type non-contact proximity switches/sensors, it is possible to decrease the effect of the opposite door quickly even if the opposite door is moving rapidly. Furthermore, by providing at the doors non-contact proximity switches/sensors respectively having directivities directed to an entrance direction and an exit direction, it is possible to detect a person getting near the door even if the doors are perfectly closed. Therefore, it is possible to provide a safety automatic door system, which does not require any repair works with respect to posts, floor, and ceiling. According to the above construction, it is possible to supply or transmit to the moving doors sufficient electric power and signals for detection. Therefore, it is possible to switch a plurality of non-contact proximity switches/sensors and perform measuring process within a short period. Furthermore, it is possible to perform safety detection process for detecting a person or an obstacle between the doors moving rapidly or between the door moving rapidly and the building.

Figure 23:
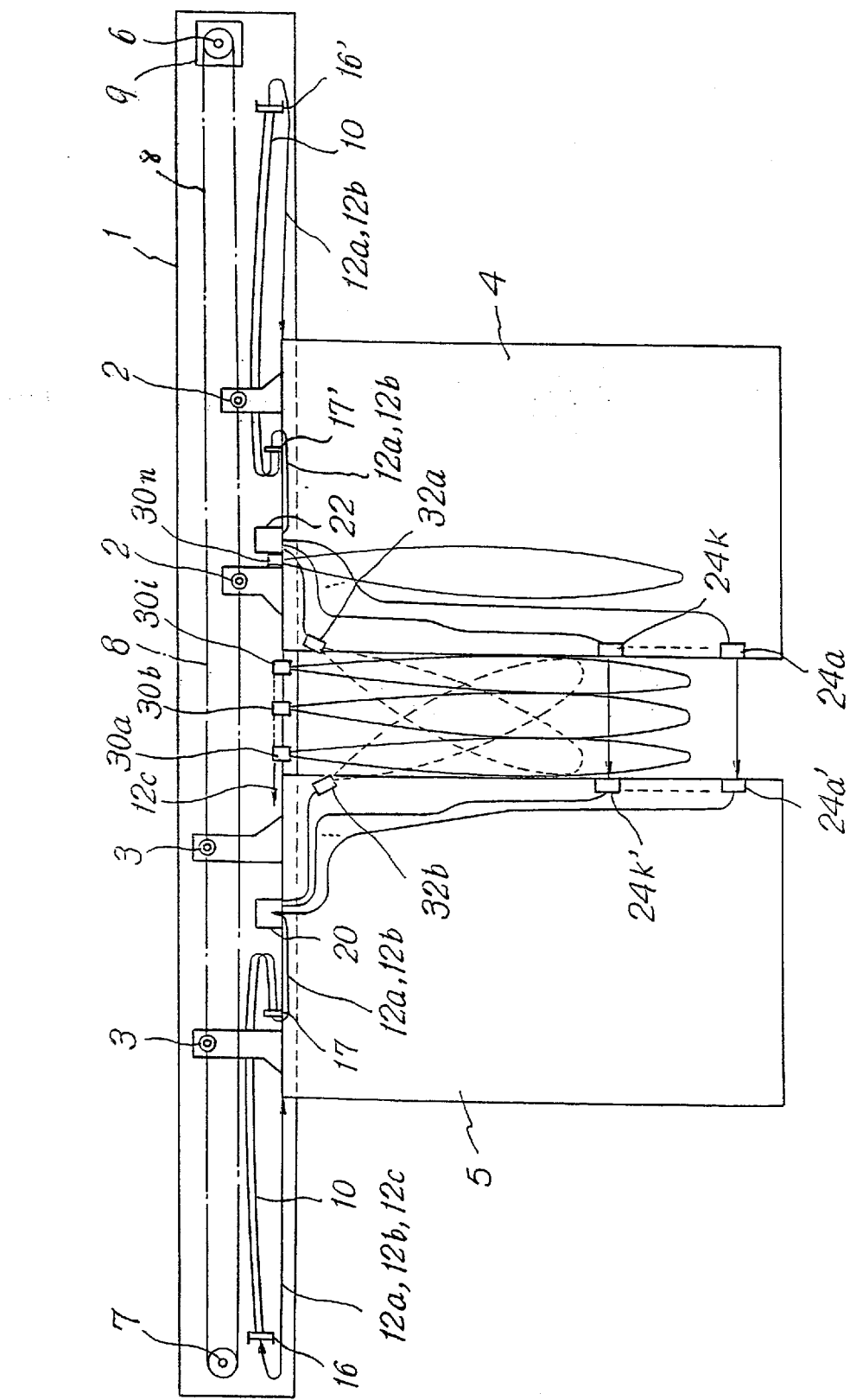
FIG. 23 is a block view showing an example of a safety system according to the present invention.
Figure 26:
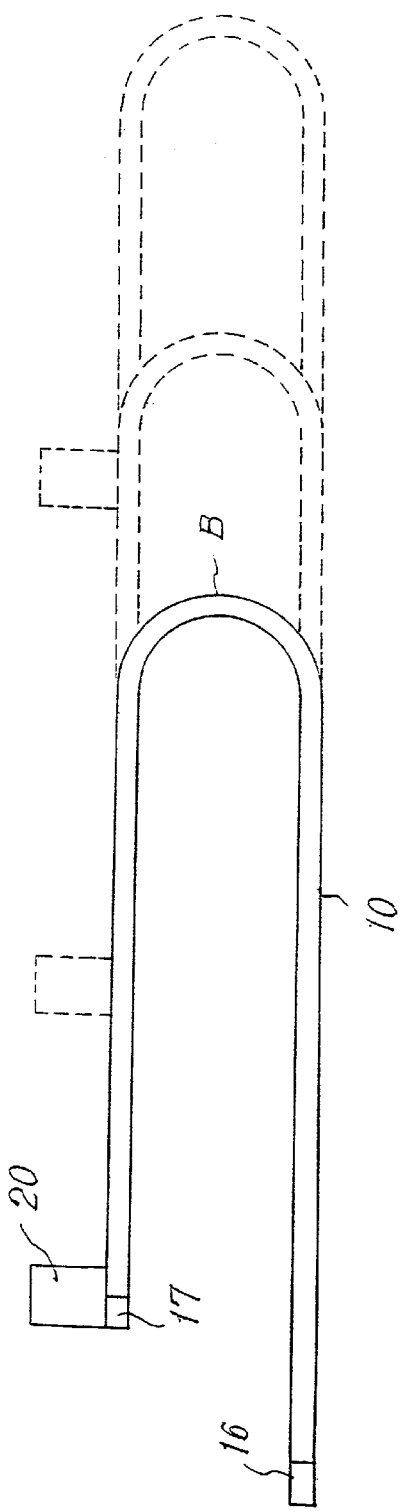
FIG. 26 is a view showing the moving condition of a cable guide.

Next, an example, wherein a movable door is used, will be explained hereinafter. FIG. 23, which corresponds to FIG. 3, shows construction of an automatic door system for building. The automatic door system is controlled by a control unit 20 provided at the upper portion of the door 5. Outputs of non-contact proximity switches 24a–24k and sensors 32a, 32b are processed to control the opening and the closing of the doors 4, 5.

The arrangement of non-contact proximity switches will be explained hereinafter with reference to FIGS. 24A–24C. Signal-transmitting sections 30a, 30b, - - - , 30n of the reflex-type non-contact proximity switches (sensors) as a first proximity switch system are respectively arranged at an immovable portion of the transom 1 as shown in FIG. 24A. Safety detection areas 130a–130n of each signal-transmitting section can be easily provided as shown in FIG. 24B, 24C. Reflection signals reflected within the safety detection areas 130a–130n are received by the signal-receiving sections 32a and 32b, which are respectively provided at the upper portions of the doors 4 and 5, and it is judged by the control unit 20 whether or not there is a person or an obstacle within the areas. In a case of an example shown in FIG. 23, reflex-type non-contact proximity switches (sensors) 24a–24k are arranged at the lower mating side of the doors 4, 5, in order to decrease the influence of reflection signal reflected by floor. Outputs 24a'–24k' of the translucent-type non-contact proximity switches are processed by the control unit 20. Any kind of sensor having spatial directivity can be used as the switches 24a–24k and the reflex-type non-contact proximity switches 30a–30n and 32a, 32b. In order to supply electric power to the opening and closing doors 4, 5, which move linearly, and in order to transmit signal to the doors and receive signal from the doors, as shown in FIG. 25, there are in parallel provided with: electric power supply cables 12a, 12b; and a cable guide 10 for guiding and holding the electric-power supply cables 12a, 12b by a support member 10. The support member 10 is made of a strip steel product, which is arc-shaped and curved in the transversal direction. One end of the support member 10 is fixed to the movable opening and closing doors 4, 5, and the other end of the support member 10 is fixed to a building, which is an immovable portion. Electric power and signals are supplied through a cable guide 10 having a parallel portion parallel to a fixed portion where the movable doors 4, 5 and the immovable portion are fixed, and a U-shape curved portion substantially having a predetermined radius of curvature where the arc-shaped convex portion constitutes an outer surface.

Namely, as shown in FIG. 5, the present invention is provided with: parallel portions A, A', which are parallel to a fixed portion 17a of the movable electric portions 4 or 5, and a fixed portion 16a of the immovable portion; and a curved portion B substantially having a predetermined radius of curvature, where the transverse arc-shaped convex portion constitutes an outer or an inner surface.

According to the above construction, the electric power supply cables 12a, 12b respectively supply electric power from the immovable portions of the building 16, 16' to the doors 4, 5, each of which reciprocates together with the belt 8, and transmits signals between the doors 4, 5 and the immovable portions 16, 16'. The electric power supply cables 12a, 12b are held and guided by the flexible support member 10.

Ferrous metal, stainless steel, amorphous ferroalloy, copper, nonferrous metal, or whisker or the alloy thereof, or ceramics containing glass and/or ceramics fiber or whisker, paper, animal/plant fiber, rubber, synthetic rubber, engineering plastic, FRP, CFRP, and/or the combination material thereof can be used as the material of the support member 10. Preferably, the support member 10 is made of a strip steel product, and as shown in FIG. 6, the cross section thereof is curved and arc-shaped. Therefore, as shown in FIG. 5, in the case where one end of the support member 10 is fixed to the door 4 or 5, and where the other end of the support member 10 is fixed to the immovable portions 16, 16' of the building, there are provided with the parallel portions A, A', which are respectively parallel to the doors 4, 5, and to the fixed portions 17a, 16a, where the immovable portions 16, 16' are respectively fixed; and the U-shape curved portion B having a substantially constant radius of curvature so as to connect the parallel portions A, A'.

Figure 27:
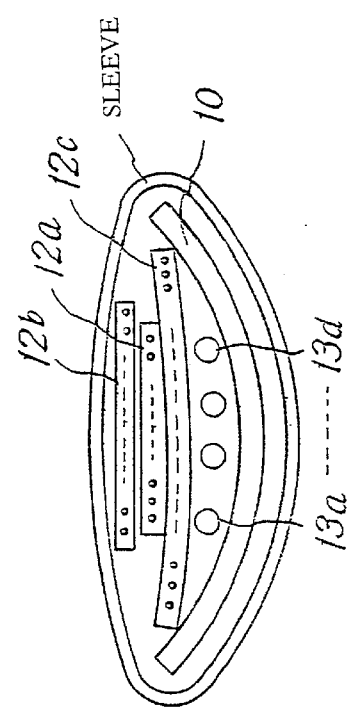
FIG. 27 is a sectional view of the cable guide.

Therefore, if the electric power supply cables 12a, 12b are guided by the support member 10, the electric power supply cables 12a, 12b are reciprocated on the right and the left along the support member 10. Since the curved portion B is folded so that the portion B has the constant radius of curvature R2, the risk of disconnection can be reduced (Reference: FIG. 27).

FIG. 27 is a sectional view where the electric power supply cables 12a, 12b are provided along the support member 10. In the present embodiment, multicore flat cables are used as the electric cables 12. The multicore flat cables are separately used for an electric power supply cable 12a, and for signal transmitting cables 12b, 12c. The flat cables 12a–12c are laminated together with the support member 10. Furthermore, the flat cables 12a–12c and the support member 10 are movably bound by a sleeve material 14 comprising of net-like synthetic resin. In the present embodiment, the flat cables 12a–12c are used, but it is also possible to use round cables 13a–13d instead of the flat cables.

The operation of the door safety system having the above construction will be explained hereinafter with reference to FIG. 23 and FIGS. 24A–24C. Signal-transmitting sections 30a–30n can be always turned on, or can be turned on with timesharing. If the doors 4, 5 are closed, the signals of the signal transmitting sections 30a–30n are interrupted by the upper portions of the doors 4, 5, and then, the signal receiving section remains as off condition. Under this condition, if it is judged by an activation switch that a person is getting near the door 4 or 5, the motor unit 9 is activated and the doors 4, 5 start to open. If a preset period (Door Opening Period) is terminated after the doors 4, 5 are opened perfectly, the doors 4, 5 start to close. Then, the signal receiving section 32*a*, provided at the head of the door 4, operates, and the output of the signal transmitting section 30*n* is emitted to the safety sensible area 130*n*. The reflection signal of the output is received by the signal receiving section 32*a*, and the control unit 20 checks whether or not the received signal level is greater than a predetermined level. If the received signal level is equal to or less than the predetermined level, the safety sensible area sequentially shifts from 130*n* to 130(n−1), 130(n−2) . . . according to the movement of the door 4. Furthermore, according to the movement of the door 5, the signal receiving section 32*b* operates, and then, the safety sensible area sequentially shifts from 130*a* to 130*b* . . . . The output signals of the signal transmitting sections are sequentially interrupted from right to left for the door 4 and left to right for the door 5, as the doors 4, 5 return to the closed position.

As shown in FIG. 24, if a person or an obstacle enters into the safety sensible areas 130*a*–130*n* during the closing operations of the doors 4, 5, the reflection signal reflected by the person or the obstacle is detected by the signal receiving sections 32*a*, 32*b*, and then, the control unit 20 outputs a control signal for opening door to the motor unit 9. Even if the person or the obstacle stays without moving within the safety sensible areas 130*a*–130*n*, the signal receiving sections 32*a*, 32*b*, which are respectively provided at the doors 4, 5, come back again, and then, the person or the obstacle staying at the areas can be detected. However, it is not necessary to detect the person or the obstacle just staying without moving within the safety sensible area. It is sufficient if it is possible to detect a person or an obstacle moving within the safety sensible area. Therefore, in this case, it is possible to simplify the circuit construction of the signal receiving sections 32*a*, 32*b*.

The safety sensible areas 130*a*–130*n* can be made wider by increasing signal energy such as light, ultrasonic, emitted from the signal transmitting sections 30*a* 30*n*, or by increasing signal amplification factors of the signal receiving sections 32*a*, 32*b*. It is preferable to select the energy and the factors so that the signal receiving sections 32*a*, 32*b* do not perform an incorrect operation by detecting signal reflected by floor. For example, as shown in FIG. 23, with respect to the space between the plane measuring 500 mm from the floor and the plane measuring 150 mm from the floor, signal transmitting sections 24*a*–24*k* of the translucent type non-contact proximity switch 24 are provided at one of the doors or the building, and signal receiving sections 24*a'*–24*k'* are provided at the other door or single moving door. By monitoring the received signal of the each translucent type non-contact proximity switch by the control unit 20, it is possible to avoid an incorrect operation caused by the reflection signal reflected by the floor, and then, more reliable door safety system can be provided. Furthermore, with respect to the example shown in FIG. 23, a plurality of translucent type non-contact proximity switches are provided at the doors 4, 5. However, it is obvious for those skilled in the art that a pair of translucent type non-contact proximity switches is sufficient to perform the above operation perfectly. Furthermore, sufficient electric energy is supplied to the doors 4 and 5 through a cable guide 10. Therefore, it is possible to make each non-contact proximity switch turned on at any moment. However, for saving energy, it is preferable to sequentially make the signal transmitting/light emitting sections 24*a*–24*k* of the proximity switches synchronized with the signal receiving/light receiving sections 24*a'*–24*k'* thereof, and at the same time, to make them turn-on or off with making the distributor 22 synchronized with the control unit 20. Furthermore, with respect to the example shown in FIG. 23, only if switching control signal for each sensor is transmitted from the control unit 20 to the distributor 22, the signal processing for the remaining signals is performed at the side of the door 5. Therefore, it is possible to omit signal lines of the signal transmitting sections, which are provided between the door 4 and the door 5. Furthermore, with respect to the above explanation, the doors having a straight-line motion are used. However, the present invention can be applied to doors having a circular motion. Furthermore, it is obvious to apply the present invention to a door safety system wherein signal transmitting sections are provided at moving doors, and wherein signal receiving sections are provided at immovable portions.

Figure 28A:
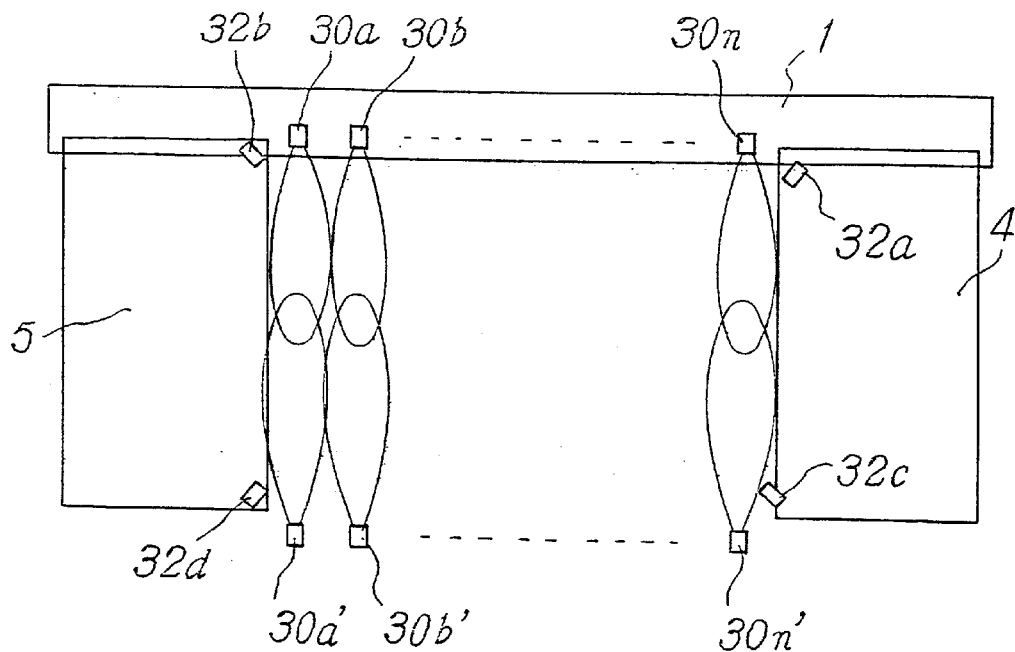
FIG. 28A shows a front view showing another example of the present invention and FIG. 28B is a side view showing the example.
Figure 28B:
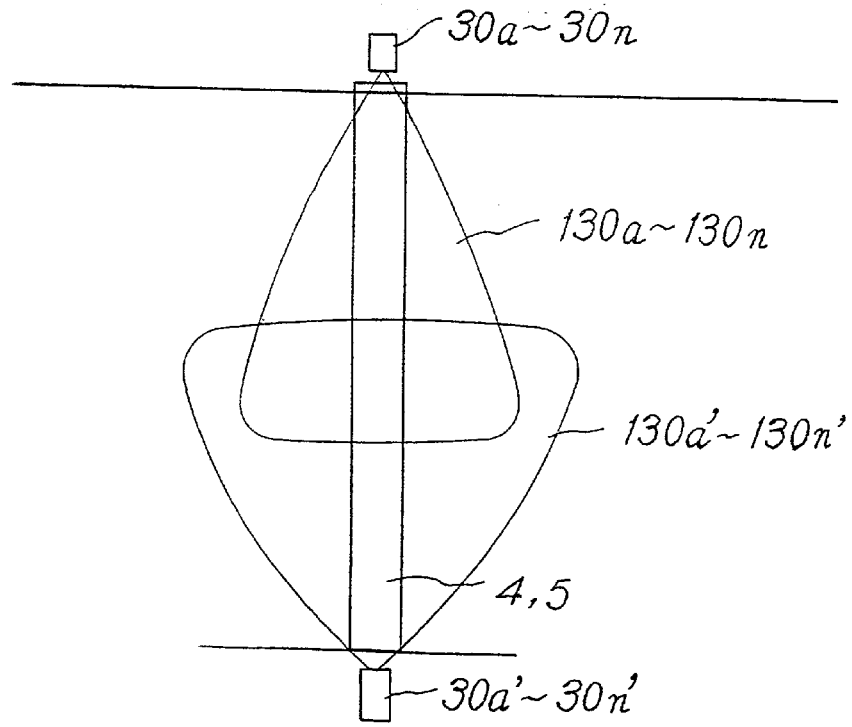

FIGS. 28A, 28B show another example of the present invention. Each unit having the same reference number respectively performs the same function, and all the translucent type proximity switches can be replaced by reflex type non-contact proximity switches. Signal transmitting sections 30*a'*–30*n'* of the reflex type non-contact proximity switches are buried into the floor section, and receiving sections for receiving reflection signals 32*c* and 32*d* are respectively provided at doors 4 and 5. The door safety system having the above construction is controlled by the control unit 20 with time sharing, so that signal transmitting period of the signal transmitting sections 30*a*–30*n* and that of 30*a'*–30*n'* do not overlap each other. During the operation period of the signal transmitting sections 30*a*-30*n*, it is checked whether or not there is a person or an obstacle between the doors by checking the outputs of the signal receiving sections 32*a*, 32*b*. On the other hand, during the operation period of the signal transmitting sections 30*a'*–30*n'*, it is checked whether or not there is a person or an obstacle between the doors by checking the outputs of the signal receiving sections 32*c*, 32*d*. Therefore, it is possible to provide a door safety system which never pinch a person or an obstacle, who is passing between the doors, even if the person or the obstacle is just standing in the moving area of the opening and closing door 4 or 5.

Figure 29:
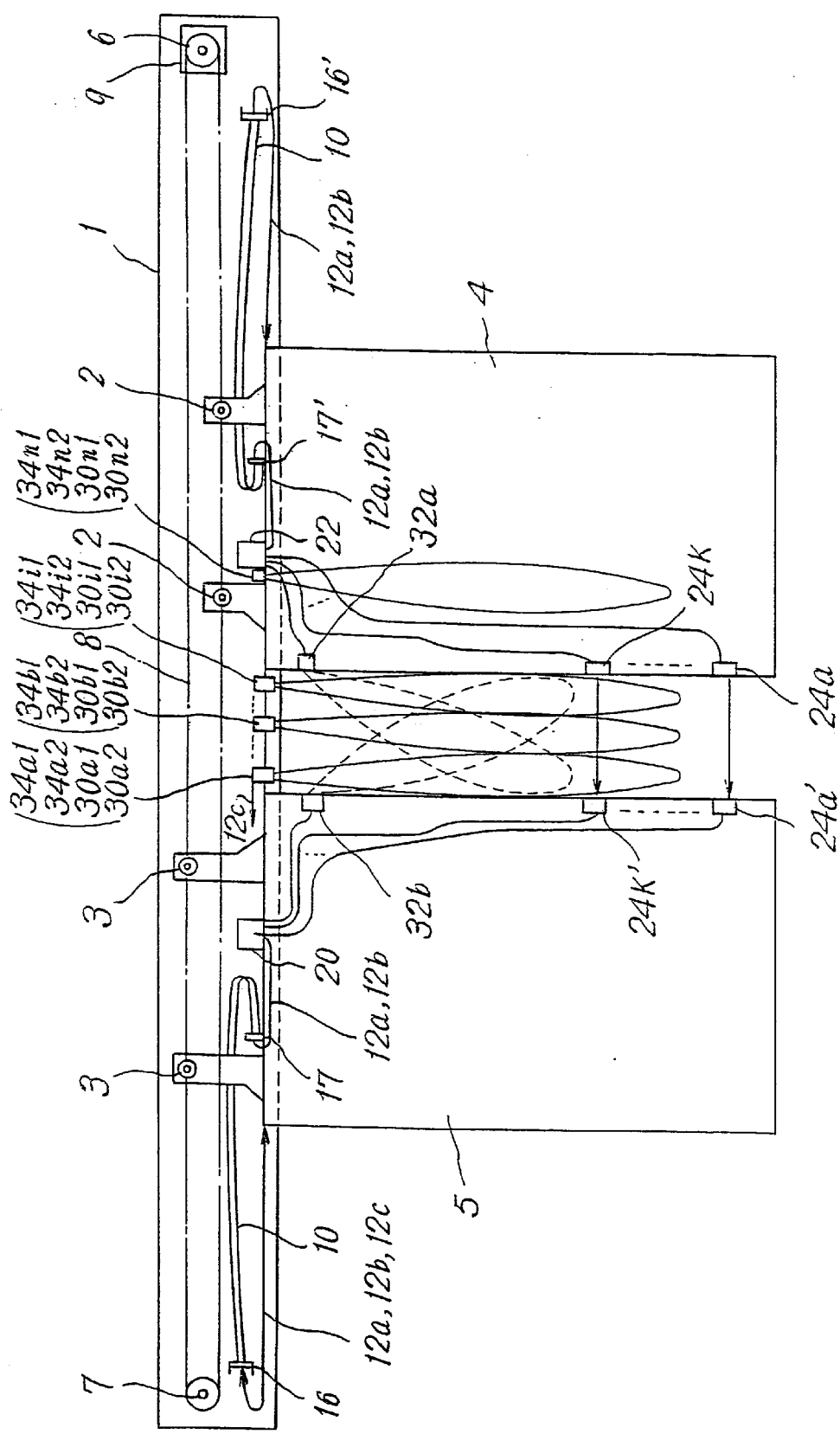
FIG. 29 is a block view showing an example of a door safety system according to the present invention.
Figure 30A:
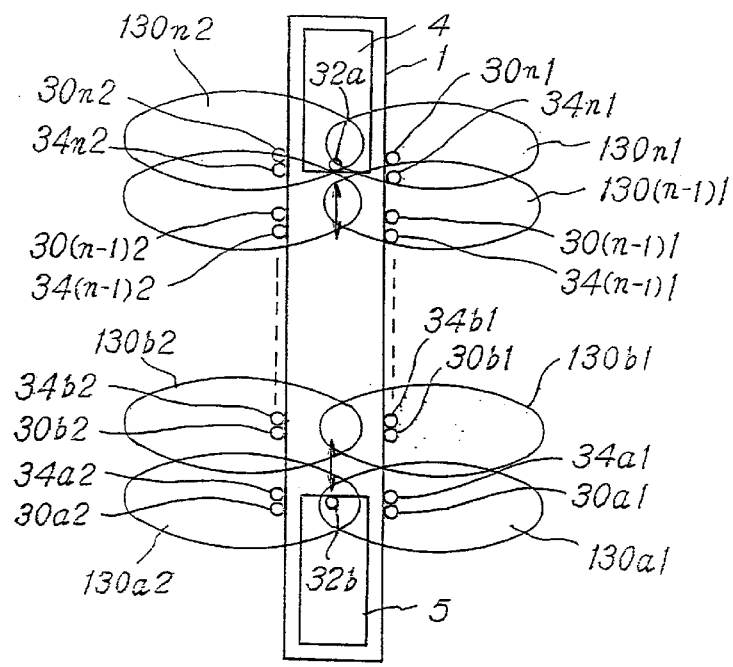
FIGS. 30A and 30B are views for explaining sensible areas of an apparatus shown in FIG. 29.
Figure 30B:
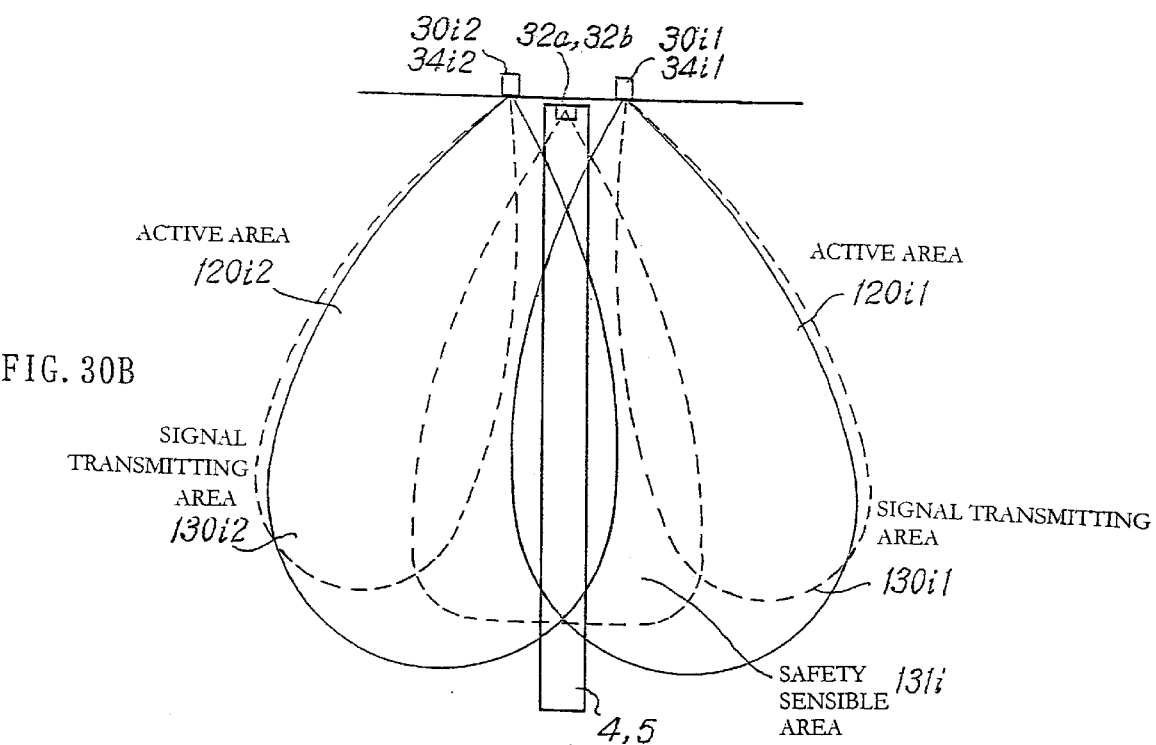
Figure 31A:
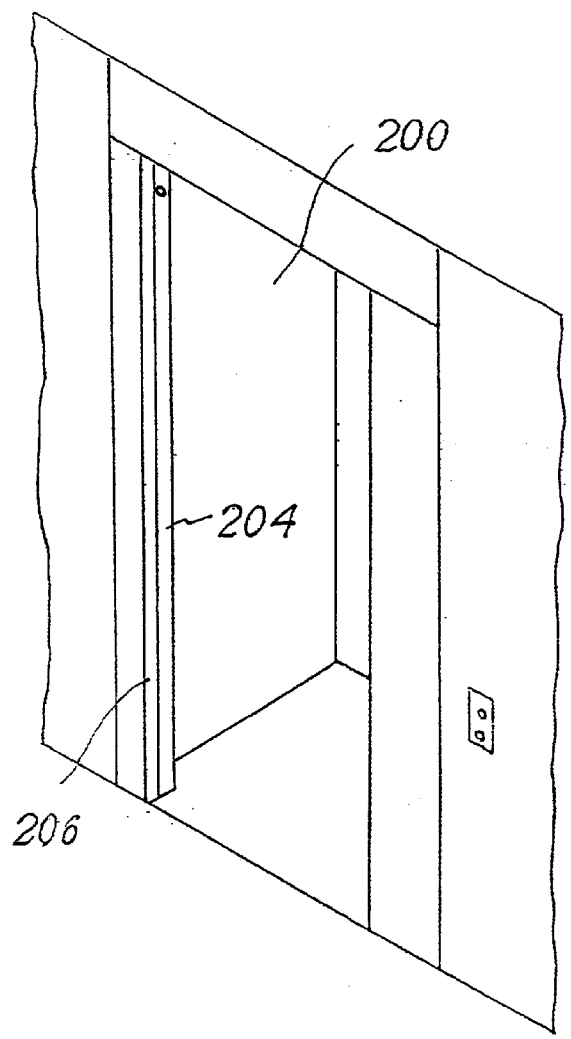
FIGS. 31A and 31B are respectively a perspective view and a plane cross section view showing an example wherein the present invention is applied to doors for an elevator.
Figure 31B:
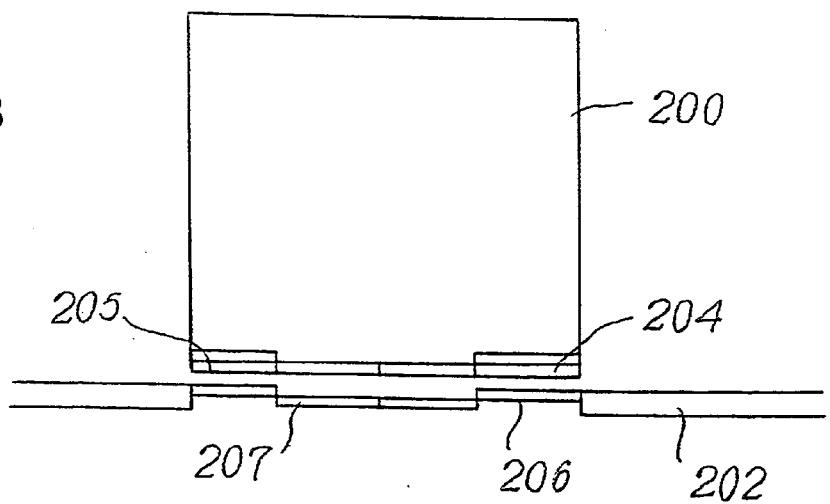

FIGS. 29, 30A and 30B show another example of the present invention. Each unit having the same reference number respectively performs the same function. Signal transmitting sections 30*a*1–30*n*1 are slightly directed to the entrance direction of building, and arranged at the side of a fixed portion of a transom 1. Reflection signals of the signal transmitting sections 30*a*1–30*n*1 are received by signal receiving sections 32*a*, 32*b*, which are provided at doors 4, 5 and which constitute a first proximity switch. The other reflection signals coming from active area 120*i*1 (i =a-n) directed to the entrance direction are received by signal receiving sections 34*a*1–34*n*1, which are provided at the transom 1, and which constitute a second proximity switch.

Furthermore, signal transmitting sections 30*a*2–30*n*2 are slightly directed to the exit direction of building, and arranged at the side of a fixed portion of the transom 1. Reflection signals of the signal transmitting sections 30*a*2–30*n*2 are received by signal receiving sections 32*a*, 32*b*, which are provided at doors 4, 5 and which constitute the first proximity switch. The other reflection signals coming from active area 120*i*2 (i=a−n) directed to the exit direction are received by signal receiving sections 34a2–34n2, which are provided at transom 1, and which constitute the second proximity switch. The outputs of the signal receiving sections 34a1–34n1 and 34a2–34n2 are inputted to the control unit 20 through a cable 12.

With respect to the above construction, for example, signal transmitting sections 30a1–30n1 and 30a2–30n2 of the non-contact proximity switch may be turned on at any time, or alternatively, with time sharing. If the doors 4, 5 are closed, input signals supplied to the signal receiving sections 32a, 32b are respectively interrupted by the doors 4, 5, and then, the signal receiving sections 32a, 32b remain off-status. Under the condition, if a person is getting near the doors 4, 5, for example from the right side of FIGS. 30A, 30B, and when the person gets into the active area 120i1, the output signal of the signal receiving section 34i of the second non-contact proximity switch is supplied to the control unit 20. Therefore, the motor unit 9 is driven by the control unit 20, and then, the doors 4, 5 start to open. After a predetermined period, during which the doors 4, 5 are perfectly opened, the doors 4, 5 start to close. And then, according to the movement of the door 4, the signal receiving section 32a provided at the mating side of the door 4 receives signal, and signal transmitting sections 32aj–30nj emit signal energy into the signal transmitting areas 130i1 and 130i2. The reflection energy reflected in the safety sensible areas is received by the signal receiving section 32a. Then, the control unit 20 checks whether or not the received energy level is greater than or equal to a predetermined level. If the received energy level is less than the predetermined level, the signal transmitting area sequentially shifts from 130nj to 130(n–1)j, 130(n–2)j, ... , (j=1, 2) according to the movement of the door 4. Furthermore, according to the movement of the door 5, the signal receiving section 32b operates, and then, the signal transmitting area sequentially shifts from 130aj to 310bj ... (j=1, 2). The output signals of the signal transmitting sections are sequentially interrupted from right to left for the door 4 and left to right for the door 5, as the doors 4, 5 return to the closed position.

If a person or an obstacle gets into the signal transmitting areas 130aj–130nj (j=1, 2) during the operation for closing the doors 4, 5, the reflection signal is detected by the signal receiving sections 32a or 32b. Then, the control unit 20 outputs to the motor unit 9, a control signal for opening door. Furthermore, even if the person or the obstacle stays without moving within the signal transmitting areas 130aj–130nj (j=1, 2), the signal receiving sections 32a, 32b, which are respectively provided at the doors 4, 5, come back again, and then, the person or the obstacle staying at the areas can be detected. However, it is not necessary to detect the person or the obstacle just staying without moving within the safety sensible area. It is sufficient if it is possible to detect a person or an obstacle moving within the safety sensible area. Therefore, in this case, it is possible to simplify the circuit construction of the signal receiving sections 32a, 32b.

The signal transmitting areas 130aj–130nj (j=1, 2) can be made wider by increasing the energy such as light, ultrasonic, emitted from the signal transmitting sections 30aj–30nj (j=1, 2), or by increasing signal amplification factors of the signal receiving sections 32a, 32b. It is preferable to select the energy and the factors so that the signal receiving sections 32a, 32b do not perform an incorrect operation by detecting signal reflected by floor. For example, as shown in FIG. 29, with respect to the space between the plane measuring 500 mm from the floor and the plane measuring 150 mm from the floor, signal transmitting sections 24a–24k of the translucent type non-contact proximity switch 24 are provided at one of the doors or the building, and signal receiving sections 24a'–24k' are provided at the other door or single moving door. By monitoring the received signal of the each translucent type non-contact proximity switch by the control unit 20, it is possible to avoid an incorrect operation caused by the reflection signal reflected by the floor, and then, more reliable door safety system can be provided. Furthermore, with respect to the example shown in FIG. 29, a plurality of translucent type non-contact proximity switches are provided at the doors 4, 5. However, it is obvious for those skilled in the art that a pair of translucent type non-contact proximity switches is sufficient to perform the above operation perfectly. Furthermore, sufficient electric energy can be supplied to the doors 4 and 5 by a cable guide 10. Therefore, it is possible to make each non-contact proximity switch turned on at any moment. However, for saving energy, it is preferable to sequentially make the signal transmitting/light emitting sections 24a–24k of the proximity switches synchronized with the signal receiving/light receiving sections 24a'–24k' thereof, and at the same time, to make them turn-on or off with making the distributor 22 synchronized with the control unit 20. Furthermore, with respect to the example shown in FIG. 29, only if switching control signal for each sensor is transmitted from the control unit 20 to the distributor 22, the signal processing for the remaining signals is performed at the side of the door 5. Therefore, it is possible to omit signal lines of the signal transmitting sections, which are provided between the door 4 and the door 5. Furthermore, with respect to the above explanation, the doors having a straight-line motion are used. However, the present invention can be applied to doors having a circular motion.

With respect to the arrangement of signal transmitting sections and signal receiving sections shown in FIGS. 30A and 30B, the outputs of signal transmitting sections 30i1, 30i2 (i=a–n) are received by signal receiving sections 34i1, 34i2 (i=a–n) and by signal receiving sections 32a, 32b. Therefore, it is not necessary to provide a signal transmitting section exclusive for the signal receiving sections 32a, 32b. With respect to a space near the moving doors 4, 5, each safety area 131i (i=a–n) is checked by the signal receiving sections 32a, 32b. Therefore, the directions of the signal receiving sections 34i1, 34i2 (i=a–n) used for an activation switch can be easily adjusted. Even if a person is just standing around the doors, the person can be easily and certainly detected just by using signal receiving sections 32a, 32b.

FIGS. 31A, 31B–33 show an example, wherein the door safety system according to the present invention is applied to an elevator. In this example, the elevator is provided with a case 200 and inner doors 204, 205. A building 202 is provided with outer doors 206, 207. More concretely, as shown in FIG. 32A, at the upper portion of the case 200, which is an immovable portion with respect to the inner doors 204, 205, there are two axes 6, 7 respectively provided with pulleys 6, 7. A part of lower side of belt 8 is connected to the door 204 through a roller 2, and a part of upper side of the belt 8 is connected to the door 205 through a roller 3. Driving the pulley 6, which is driven by a motor unit 9 including a motor and a deceleration mechanism, opens the doors 204, 205. This system is controlled by a control unit 20, which is mounted at the immovable portion of the case 200 and which processes output of a sensor.

Figure 32A:
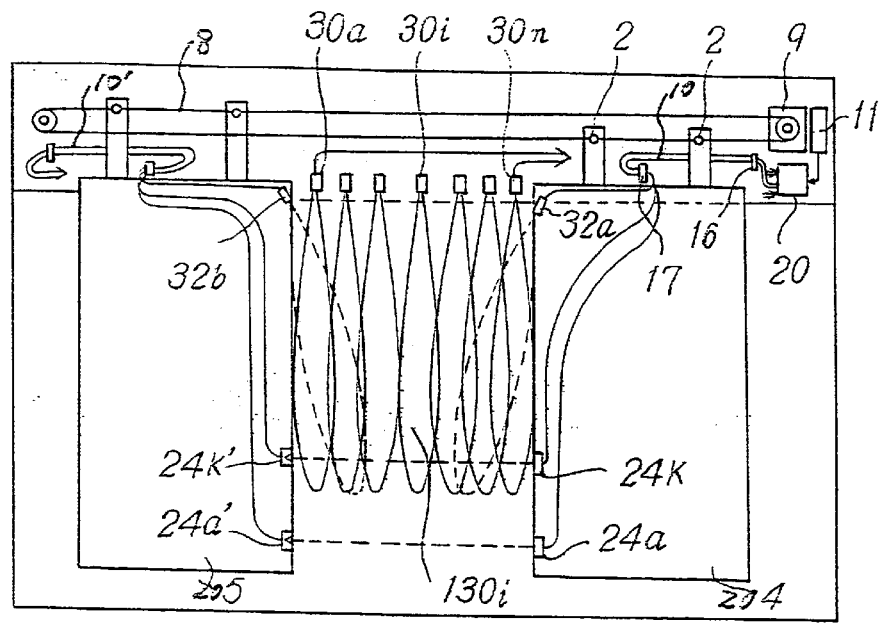
FIGS. 32A and 32B are respectively a front block view and a side block view for explaining an arrangement and sensible areas of sensors.
Figure 32B:
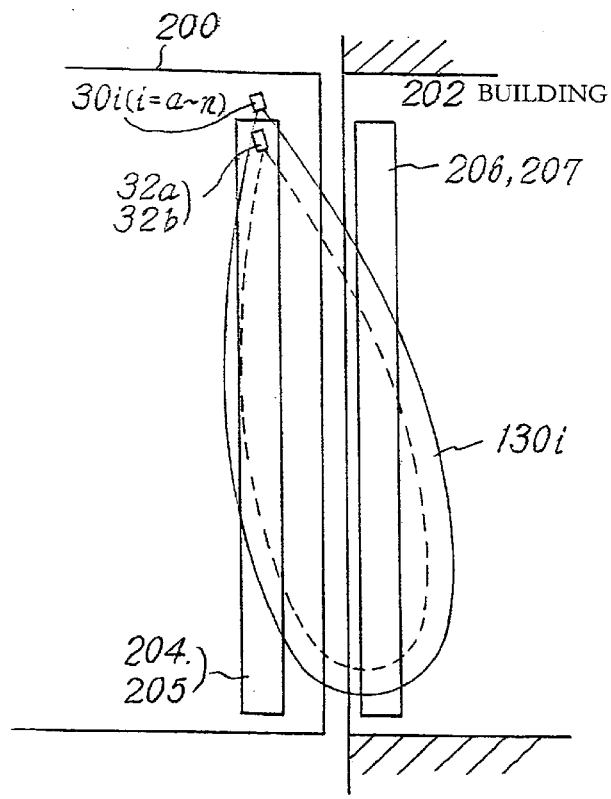

The arrangement of the non-contact proximity switches is explained in detail hereinafter with reference to FIGS. 32A and 32B. There are provided with signal transmitting sections 30*a*, 30*b*, . . . , 30*n* of the reflex type non-contact proximity switch (sensor) at the upper portion of the case 200, which is an immovable portion with respect to the doors. The signal transmitting sections ar e slightly inclined to the directions of the outer doors 206, 207. E ach safety sensible area of each signal transmitting sections 130*i* (i=a–n) are arranged as shown in FIGS. 32A and 32B. The reflection signal reflected within the safety sensible area 130*i* is received by the signal receiving sections 32*a*, 32*b*, which are provided at the upper portion of the moving doors 204, 205. The outputs of the signal receiving sections 32*a*, 32*b* are inputted through cable guides 10, 10' to the control unit 20, which judges whether or not there is a person or an obstacle. With respect to the example shown in FIG. 32, there is provided with signal transmitting sections 24*a*–24*k* of translucent type non-contact proximity switches (sensors) is provided at the lower mating side of the doors 204, 205 so as to decrease the effect of the reflection signal reflected by the floor. The received signal outputs 24*a*'–24*k*' are inputted to the control unit 20 through a cable guide 10', and then it is judged whether or not there is a person or an obstacle. Any kind of sensor or switch having a spatial directivity can be used as the translucent type non-contact proximity switches 24*a*–24*k* and the reflex-type non-contact proximity switches 30*a*–30*n* and 32*a*, 32*b*. However, it is preferable to use an infrared detecting type proximity switch, which can be easily mounted even if the space for mounting the switch is rather small when it is buried into the moving door.

Figure 33:
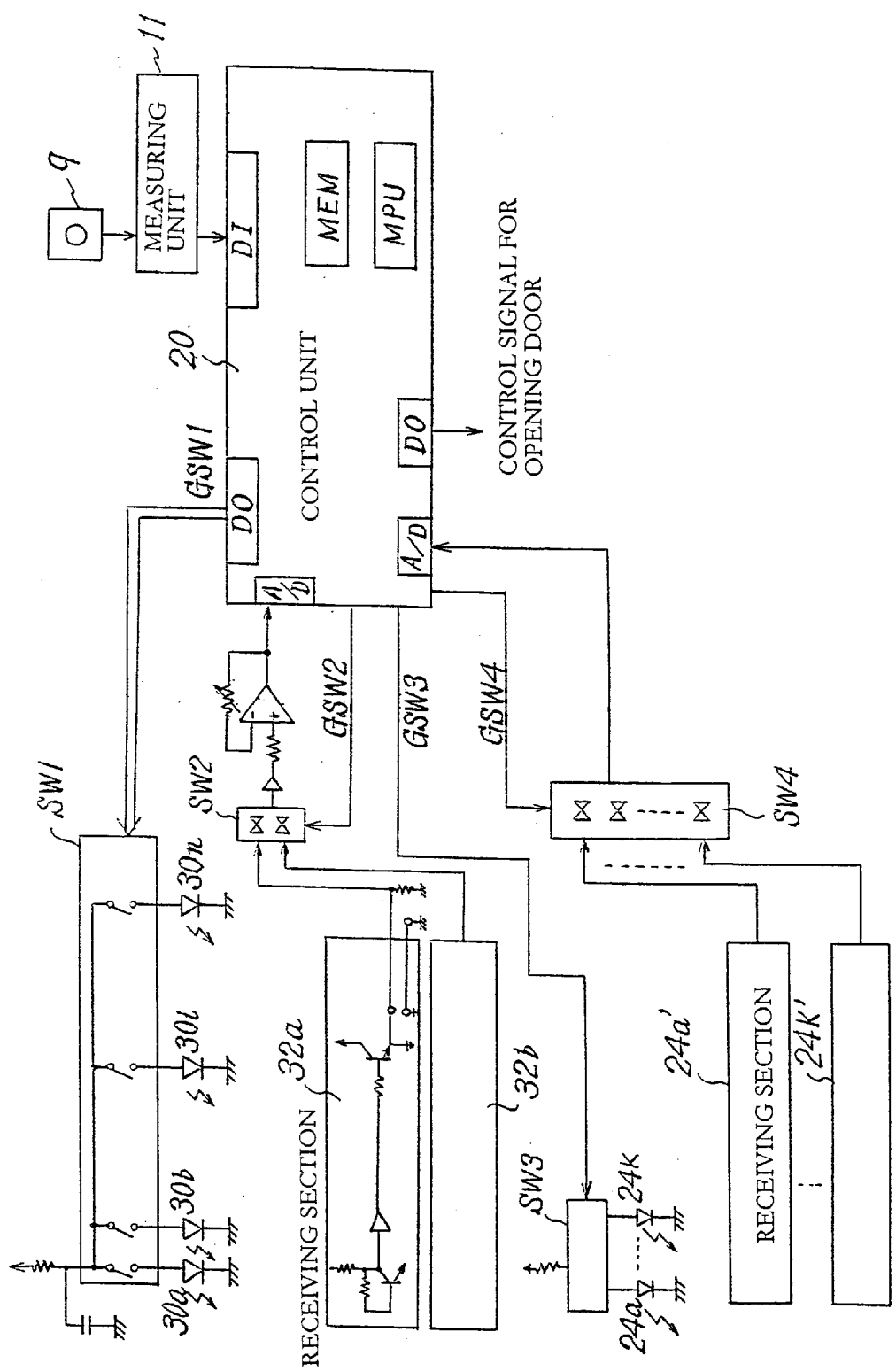
FIG. 33 is a block view showing an example of a door safety system for an elevator.

FIG. 33 shows an electrical block diagram of the control unit 20, wherein the control unit 20 is constructed by microcomputers. A measuring unit 11 for measuring a distance between the doors 204, 205 is constructed by connecting a rotary encoder or a linear encoder to a motor unit 9. The output signal of the measuring unit 11 is inputted to the control unit 20, which calculates a current position of the door. Switching unit SW1 is turned on or off by a control signal GSW1 so as to control a signal transmitting operation of a first proximity switch, and to control electric power supply to the signal transmitting sections 30*a*–30*n*. The reflection signals of the signal transmitting sections are received by the signal receiving section 32*a* or 32*b*, and then, inputted to the control unit 20 through a multiplexer SW2 and an A/D converter. Furthermore, a switching unit SW3 is controlled to be turned on or off by a control signal GSW3 so as to control a signal transmitting operation of a second proximity switch, and then, an electrical power supply to the signal transmitting sections 24*a*–24*k* is controlled to be turned on or off. The translucent signals of the signal transmitting sections 24*a*–24*k* is received by signal receiving sections 24*a*'–24*k*', and inputted to the control unit 20 through a multiplexer SW4 and an A/D converter.

Figure 35:
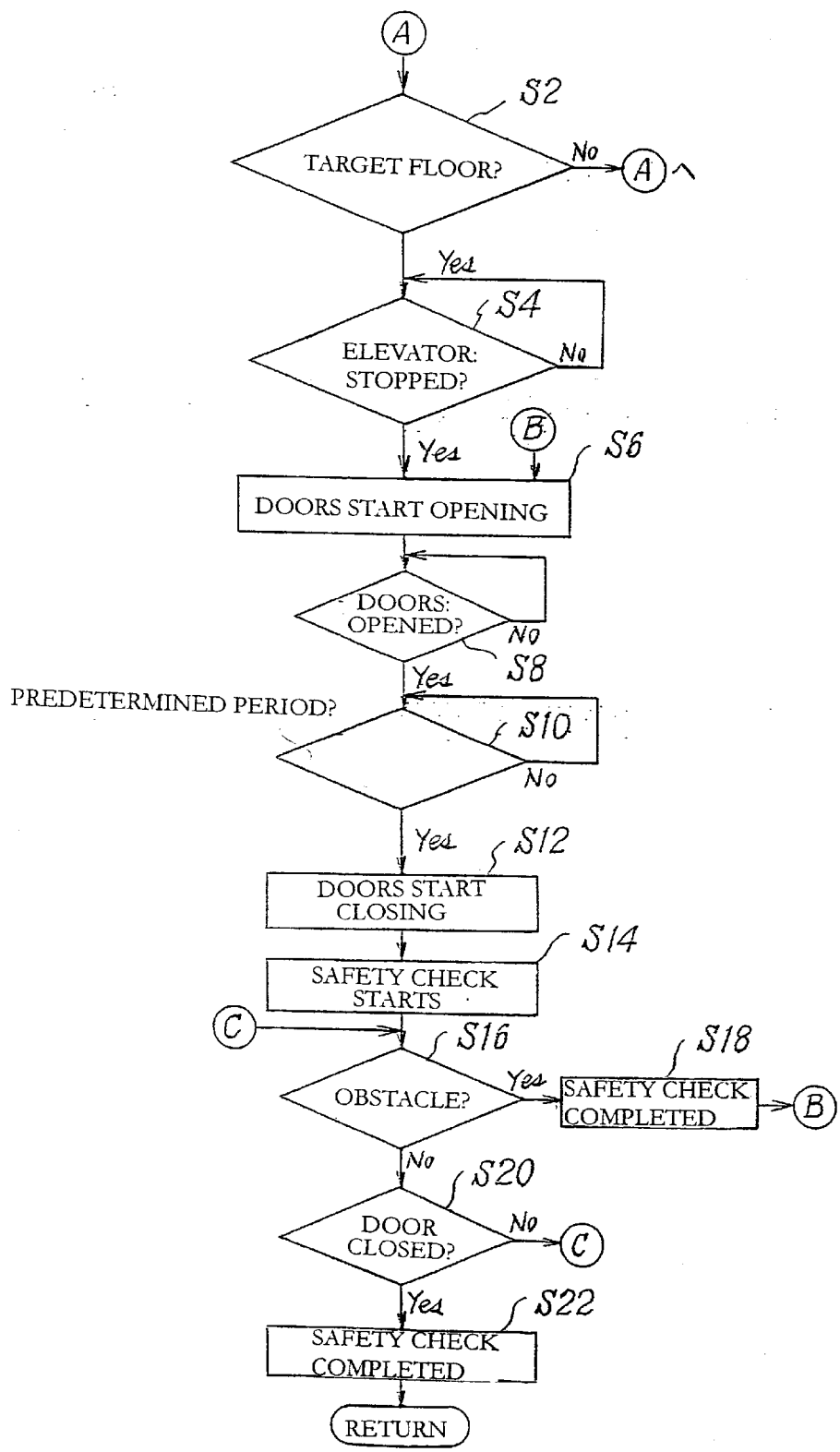
FIG. 35 is a flowchart showing an example of operation for controlling an elevator.

The operation of the above system will be explained in detail hereinafter with reference to FIGS. 34 and 35. Firstly, if the elevator is instructed to get to a specific floor according to an instruction from a switch for calling the elevator (not shown), the control unit 20 instructs the elevator to get to the instructed floor with the doors 204, 205 being closed (Step S2). Then, it is judged whether or not the case 200 is perfectly stopped (Step S4). Secondly, if it is judged that the case 200 is perfectly stopped, the doors 204, 205 start to open (Step S6). Then, if the doors 204, 205 are perfectly opened (Step S8), the doors are kept opened for a predetermined period, for example one minute (Step S10), and then the doors start to close (Step S12). At the same time, a safety checking operation also starts (Step S14). With respect to the safety checking operation, firstly, the measuring unit 11 measures the distance between the doors 204, 205 and the operation of the signal transmitting sections 30*a*–30*n* are controlled according to the distance being sequentially changed. More concretely, as shown in FIG. 34, an electric power supply table for controlling electric power supply of the signal transmitting sections with respect to the distance between the doors is previously prepared by performing some experiments. This table is prepared so as to avoid a misjudgment that a person is passing between the doors when the signal reflected by the moving door is received. The misjudgment is caused by the position of the signal transmitting sections and the directions of signal receiving sections 32*a*, 32*b*. Then, if the distance information is inputted from the measuring unit 11, power supply control information with respect to the current distance between the doors is read out from the table shown in FIG. 34, and then, inputted to the switching unit SW1. Accordingly, by switching the multiplexer SW2, the output of the signal receiving section 32*a* mounted at the door 204 is inputted to the control unit 20 and the output of the signal receiving section 32*b* mounted at the door 205 is also inputted to the control unit 20. Then, the control unit 20 judges whether or not the output of the signal receiving section 32*a* or 32*b* is greater than or equal to a predetermined level, and then it is judged whether or not there is a person or an obstacle. The reflection signal is inputted to the signal receiving sections 32*a*, 32*b*. Therefore, if the signal level of the received reflection signal is greater than or equal to a predetermined level, it is judged that there is a person or an obstacle. In this case (Step S16, yes), the safety checking operation is completed (Step S18), and then, the process is back to the step S6.

Furthermore, if the above safety checking operation by using the reflex type non-contact proximity switch is completed, all the switches included in the switching unit SW1 are turned off and reset. At the same time, all the switches including the switching unit SW3 are turned on, and then, the outputs of the signal receiving sections 24*a*'–24*k*' of the translucent type non-contact proximity switch are inputted to the control unit 20 by sequentially switching the multiplexer SW4. Then, it is judged whether or not there is a person or an obstacle who or which interrupts the energy emitted from and received by the translucent type non-contact proximity switch. In the case where the translucent type switch is used, if the received translucent energy level is less than a predetermined level, it is judged that there is a person or an obstacle. Then, the process is back to step S6 through step S18.

After the safety checking operation using the translucent type non-contact proximity switch is completed, all the switches included in the switching unit SW3 are turned off and reset. At the same time, the distance information is inputted from the measuring unit, and then, the above safety checking operations using the reflex type non-contact proximity switch and the translucent type non-contact proximity switch are repeated (Step S20) until the doors are perfectly closed. If the doors are perfectly closed, the safety checking operations are completed (Step S22). In a case where the door safety system is used for an automatic door system of building, there is no problem of turning the system on at any time. However, in a case where the door safety system is used for an elevator or a vehicle such as an automobile, a train or the like, it is quite dangerous to control the opening and the closing of the doors while the vehicle is moving. Therefore, in this case, it is necessary to provide the vehicle with a safety system for detecting whether a case of the elevator or the vehicle is perfectly stopped or not.

The signal receiving sections 32*a*, 32*b* can detect a person or an obstacle by controlling the signal transmitting sections mounted at the inner side of the moving doors according to the moving distances of the moving doors so that the outputs of the signal transmitting sections are not reflected by the moving doors. If a translucent type non-contact proximity switch is used, the safety checking operation is just performed with respect to the door where the switch is mounted (for example, the inner door in the example shown in FIG. 32A). However, according to the present invention, the safety checking operation is performed with respect to the inner doors and the outer doors. The translucent type non-contact proximity switch is always turned on during the operation of closing the doors by adjusting the output wave length or the output frequency of the translucent-type non-contact proximity switch and that of the reflex-type non-contact proximity switch so as to avoid the interference between the two outputs. The method of controlling the signal transmitting section according to the moving distances of the moving doors can be applied to an automatic door system for building. Furthermore, in a case of an apparatus for controlling the operation or the stand-by status of the signal transmitting section or the signal receiving section by inputting the distance information between the doors or between the moving door and the immovable portion, even if the signal transmitting section and the signal receiving section, which constitute the non-contact proximity switch, are arranged at the immovable portion, it is possible to recognize the person or the obstacle without misunderstanding it as the moving door, if electric power is supplies to the signal transmitting sections located at the safety sensible area, where the moving doors do not exist, by using the control table shown in FIG. 34. As the position measuring unit, there is a measuring unit for measuring the distance between the doors based on the received signal level of an optical-type, an ultrasonic-type, an infrared-type, or a millimeter wave-type non-contact proximity switch. The switch previously measures and stores the received signal level according to each distance with having output level of the signal-transmitting section of the translucent non-contact proximity switch constant and indirectly calculates a distance information based on the received signal level of the translucent non-contact proximity switch.

FIGS. 36A–36C show an example wherein the door safety system according to the present invention is applied to moving doors of vehicle. With respect to a door 302 of a vehicle 310, a window 302, which is driven by an electric motor (not shown), goes up and down within a movable space 304. There is provided with a slot at the upper end of the window 310, and small-size signal transmitting sections 312$i$(i=a–m) are buried in the slot. Signal receiving sections 320$i$ (i=a–n) are provided at the upper portion, for containing the window 310, of the door 302 so that each signal receiving section respectively faces the corresponding signal transmitting section. Electric energy and control signals are supplied to a control unit 20 and the signal transmitting sections 320$i$ through a cable guide 10. Each output of the each signal receiving sections is inputted to the control unit 20 through multiplexers.

With respect to the above construction, the operation of the above system will be explained hereinafter. The control unit 20 is in stand-by condition during the operation of opening the window and when the window is stepped. The control unit 20 starts the safety checking operation if an instruction for closing the window is inputted to the control unit 20. At regular intervals (for example, every one second), electric power is supplied to the signal transmitting sections 312$i$ (i=a–m). Translucent signals emitted from the signal transmitting sections are received by the signal receiving sections 320$i$ (i=a–m), and then, the received signals are checked to detect whether or not the each received signal is interrupted by a person or an obstacle. If one of the received signals is interrupted, a control signal for reversing the rotating direction of an electric motor (a control signal for opening the window) is outputted. If all the received signals are received without any problem, the above processes are repeated until the window is perfectly closed. Therefore, it is possible to provide a door safety system, wherein a child is never caught by the closing window even if the child erroneously puts a switch for closing the window.

As explained the above, according to the door safety system for the moving door of the present invention, the signal transmitting sections and the signal receiving sections are respectively arranged at the moving doors and at the immovable portion such as building. Therefore, it is possible to activate the non-contact proximity switch at any time for detecting a moving object. The directions and the threshold levels of the signal transmitting sections and the signal receiving sections can be easily adjusted. Accordingly, the reliability of this system can be enhanced, and the cost for manufacturing this system can be reduced. Furthermore, in a case of an elevator system, inner doors and outer doors are opened and closed at the same time, According to the safety system of the present invention, it is possible to prevent a person or an obstacle from being caught between the inner or outer doors or from colliding with the inner or outer door by providing the door safety system at the immovable portion of a case going up and down and at the inner doors. Furthermore, if the present invention is applied to an electrically powered window, it is possible to prevent a child from being caught by the window, which is caused by the mis-operation. Additionally, with respect to a door or a window, which has a reciprocating motion rectilinearly, or a circumferential reciprocating motion, electric power and signal for sensor can be supplied or transmitted through a cable guide having a good endurance. Therefore, it is possible to switch a plurality of non-contact proximity switches and to perform a process of measuring within a short period, and then it is possible to certainly detect a person or an obstacle even if the doors are moving rapidly.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A door safety system comprising:

a translucent-type non-contact proximity switch, provided at moving doors used for an automatic door system, for detecting a person or obstacle and for controlling a movement of the doors so as to prevent the person or the obstacle from colliding with the moving doors, so that the person or the obstacle can be detected with respect to a moving space of the moving doors;

electric power supply cables for supplying at least one of electric power and signals to the moving doors; and a cable guide for guiding and holding the electric power supply cables by a flexible support member, wherein the support member is made of strip steel product, which is arc-shaped and curved in a transversal direction, wherein one end of the support member is fixed to the moving doors and the other end of the support member is fixed to an immovable portion, and wherein the at least one of electric power and signals are transmitted through the cable guide comprising parallel portions which are parallel to the fixed portion of the moving doors and the fixed portion of the immovable portion, and a curved portion substantially having a predetermined radius of curvature, where the arc-shaped convex portion constitutes an outer surface, wherein the radius of curvature of the arc-shaped portion of the support member with respect to the transversal direction is substantially equal to that of the curved portion of the support member.

2. The door safety system according to claim 1, further comprising:

measuring means for measuring a distance between moving doors, or between a moving door and an immovable portion; and controlling means for outputting a control signal for controlling opening and closing of the moving door so as to prevent a person or an obstacle from colliding with the moving door, by amending output of the non-contact proximity switch based on the distance, and by eliminating an effect of the moving door or the immovable portion.

3. The door safety system according to claim 2, wherein the distance is obtained from output of the translucent type non-contact proximity switch.

4. A door safety system according to claim 1, further comprising the control means for controlling a plurality of non-contact proximity switches provided at the moving doors so that interference caused by outputs of the switches can be avoided by providing a phase deference between outputs.

5. The door safety system according to claim 1, wherein the translucent-type non-contact proximity switches are at least one of an optical-type proximity switch, an ultrasonic proximity switch, an infrared detecting type proximity switch and a millimeter wave radar sensor.

6. A door safety system wherein signal receiving sections or signal transmitting sections of a non-contact proximity switch for detecting a person or an obstacle and for controlling movements of moving doors, are provided at a side of one of the moving doors at safety sensible areas, and wherein signal transmitting sections corresponding to the signal receiving sections or signal receiving sections corresponding to the signal transmitting sections of the non-contact proximity switch are separately provided at a fixed immovable portion corresponding to the side, so that the person or the obstacle can be detected with respect to a moving space of the moving doors so as to prevent the person or the obstacle from colliding with the moving doors and the safety sensible areas sequentially shift to the movement of the doors, the door safety system further comprising:

electric power supply cables for supplying at least one of electric power and signals to the moving doors; and a cable guide for guiding and holding the electric power supply cables by a flexible support member, wherein the support member is made of strip steel product, which is arc-shaped and curved in a transversal direction, wherein one end of the support member is fixed to the moving doors and the other end of the support member is fixed to the fixed immovable portion, and wherein the at least one of the electric power and the signals are transmitted through the cable guide comprising parallel portions which are parallel to the fixed portion of the moving doors and the fixed immovable portion, and a U-shaped curved portion substantially having a predetermined radius of curvature, where the arc-shaped convex portion constitutes an outer or an inner surface.

7. The door safety system according to claim 6, wherein the non-contact proximity switches are translucent-type non-contact proximity switches respectively having at least one of spatial directivity and reflex-type non-contact proximity switches respectively having another spatial directivity.

8. The door safety system according to claim 6, wherein a plurality of signal transmitting sections or a plurality of signal receiving sections of the non-contact proximity switches are provided at the fixed immovable portion.

9. The door safety system according to claim 6, wherein at least one common signal receiving sections, which correspond to the signal transmitting sections provided at the fixed immovable portion, and at least one signal transmitting sections, which correspond to the signal receiving sections provided at the fixed immovable portion, are provided at the moving doors.

10. The door safety system according to claim 7, wherein the signal transmitting section of the translucent type or the reflex-type non-contact proximity switch is respectively used as that of the reflex type or the translucent type non-contact proximity switch, and wherein the signal receiving section of the translucent type or the reflex type non-contact proximity switch is respectively used as that of the reflex type or the translucent type non-contact proximity switch.

11. The door safety system according to claim 6, further comprising:

measuring means for measuring a distance between the moving doors, or between a moving door and an immovable portion; and controlling means for outputting a control signal for controlling the signal transmitting sections and the signal receiving sections of the non-contact proximity switch based on the distance, and by eliminating an effect of the moving door or the immovable portion.

12. The door safety system according to claim 11, wherein the distance is measured by using the output of translucent-type non-contact proximity switch.

13. The door safety system according to claim 6, wherein the radius of curvature of the arc-shaped portion of the support member with respect to the transversal direction is substantially equal to that of the U-shape curved portion of the support member.

14. The door safety system according to claim 6, wherein the non-contact proximity switches are at least one of an optical-type proximity switch, an ultrasonic proximity switch, an infrared detecting type proximity switch and a millimeter wave radar sensor.

15. The door safety system according to claim 6, wherein the moving door is used for an automatic door system provided at an entrance or an exit of a building, or opening and closing doors for an elevator, or an automatic door system for a vehicle.

16. The door safety system according to claim 15, wherein when the doors are used for the opening and closing doors for an elevator, the non-contact proximity switch is operated according to a condition of the immovable portion.

17. A door safety system according to claim 6, wherein the moving door is moved to a straight-line direction or a circumferential direction.

18. A door safety system, comprising:

at least one signal receiving sections and signal transmitting sections of a first non-contact proximity switch, provided at a side of moving doors at safety sensible areas, for detecting a person or an obstacle and for controlling a movement of the doors to prevent the person or the obstacle from colliding with the moving doors; and at least one signal transmitting sections, which corresponds to the signal receiving sections, or at least one signal receiving sections, which corresponds to the signal transmitting sections, provided at an immovable portion, so that the person or the obstacle can be detected with respect to a moving space of the moving doors so as to prevent the person or the obstacle from colliding with the moving doors, and the safety sensible areas sequentially shift according to the movement of the door, and said door safety system further comprising a second non-contact proximity switch having a spatial directivity directed to an entrance direction and another spatial directivity directed to an exit direction, so that a person or an obstacle getting near the doors can be detected even if the doors are closed.

19. The door safety system according to claim 18, wherein the non-contact proximity switches are translucent-type non-contact proximity switches respectively having at least one of spatial directivity and reflex-type non-contact proximity switches respectively having another spatial directivity.

20. The door safety system according to claim 18, wherein a plurality of signal transmitting sections or a plurality of signal receiving sections of the first non-contact proximity switches are provided at the fixed immovable portion.

21. The door safety system according to claim 18, wherein at least one common signal receiving sections, which correspond to the signal transmitting sections provided at the fixed immovable portion, and at least one signal transmitting sections, which correspond to the signal receiving sections provided at the fixed immovable portion, are provided at the moving doors.

22. The door safety system according to claim 19, wherein the signal transmitting section of the first translucent-type or the first reflex-type non-contact proximity switch is respectively used as that of the reflex-type or the translucent-type non-contact proximity switch, and wherein the signal receiving section of the first translucent-type or the first reflex-type non-contact proximity switch is respectively used as that of the reflex-type or the translucent-type non-contact proximity switch.

23. The door safety system according to claim 18, further comprising:

measuring means for measuring a distance between the moving doors, or between a moving door and an immovable portion; and controlling means for outputting a control signal for controlling the signal transmitting sections and the signal receiving sections of the non-contact proximity switch based on the distance, and by eliminating an effect of the moving door or the immovable portion.

24. The door safety system according to claim 23, wherein the distance is measured by using the output of translucent-type non-contact proximity switch.

25. The door safety system according to claim 18, further comprising:

electric power supply cables for supplying at least one of electric power and signals to the moving doors; and a cable guide for guiding and holding the electric power supply cables by a flexible support member, wherein the support member is made of strip steel product, which is arc-shaped and curved in a transversal direction, wherein one end of the support member is fixed to the moving doors and the other end of the support member is fixed to the fixed immovable portion, and wherein the at least one of the electric power and the signals are transmitted through the cable guide comprising parallel portions which are parallel to the fixed portion of the moving doors and the fixed immovable portion, and a U-shaped curved portion substantially having a predetermined radius of curvature, where the arc-shaped convex portion constitutes an outer or an inner surface.

26. The door safety system according to claim 25, wherein the radius of curvature of the arc-shaped portion of the support member with respect to the transversal direction is substantially equal to that of the U-shape curved portion of the support member.

27. The door safety system according to claim 18, wherein the non-contact proximity switches are at least one of an optical-type proximity switch, an ultrasonic proximity switch, an infrared detecting type proximity switch and a millimeter wave radar sensor.

28. The door safety system according to claim 18, wherein the moving door is used for an automatic door system provided at an entrance or an exit of a building, or opening and closing doors for an elevator, or an automatic door system for a vehicle.

29. The door safety system according to claim 28, wherein when the doors are used for the opening and closing doors for an elevator, the non-contact proximity switch is operated according to a condition of the immovable portion.

30. The door safety system according to claim 18, the second non-contact proximity switches are provided at the moving doors and/or the immovable portion.

31. The door safety system according to claim 18, wherein the moving door is moved to a straight-line direction or a circumferential direction.

32. The door safety system according to claim 28, wherein when the moving door is an automatic door system for a vehicle the vehicle is a train or automobile.

* * * * *